United States Patent
Di Girolamo et al.

(10) Patent No.: US 12,004,257 B2
(45) Date of Patent: Jun. 4, 2024

(54) DEVICE DISCOVERY AND CONNECTIVITY IN A CELLULAR NETWORK

(71) Applicant: InterDigital Patent Holdings, Inc., Wilmington, DE (US)

(72) Inventors: Rocco Di Girolamo, Laval (CA); Catalina Mihaela Mladin, Hatboro, PA (US); Michael F. Starsinic, Newtown, PA (US); Hongkun Li, Malvern, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 223 days.

(21) Appl. No.: 17/283,076

(22) PCT Filed: Oct. 4, 2019

(86) PCT No.: PCT/US2019/054698
§ 371 (c)(1),
(2) Date: Apr. 6, 2021

(87) PCT Pub. No.: WO2020/076630
PCT Pub. Date: Apr. 16, 2020

(65) Prior Publication Data
US 2021/0385642 A1 Dec. 9, 2021

Related U.S. Application Data

(60) Provisional application No. 62/742,638, filed on Oct. 8, 2018.

(51) Int. Cl.
*H04W 4/00* (2018.01)
*H04W 8/00* (2009.01)
(Continued)

(52) U.S. Cl.
CPC ............. *H04W 8/005* (2013.01); *H04W 8/18* (2013.01); *H04W 84/042* (2013.01)

(58) Field of Classification Search
CPC ..... H04W 8/005; H04W 84/042; H04W 8/18; H04W 8/00
(Continued)

(56) References Cited

U.S. PATENT DOCUMENTS 8,782,121 B1 * 7/2014 Chang ................... H04L 67/104
709/219
8,782,122 B1 * 7/2014 Chang ................. H04L 67/1048
709/219
(Continued)

OTHER PUBLICATIONS

Sierra Wireless: "Closed Discovery Use Case", 3GPP Draft; S1-121333, 3rd Generation Partnership Project (3GPP), Mobile Competence Centre; 650, Route Des Lucioles; F-06921 Sophia-Antipolis Cedex; France, vol. SA WG1, No. Seville, Spain; May 7, 2012-May 11, 2012, (May 14, 2012), XP050624978, [retrieved on May 14, 2012].
(Continued)

*Primary Examiner* — Marceau Milord
(74) *Attorney, Agent, or Firm* — Flaster Greenberg P.C.

(57) ABSTRACT

Methods and apparatus are disclosed for facilitating social discovery and social communication among M2M/IoT devices, connected via cellular networks, such as 3 GPP NR networks, and, optionally, supported by M2M/IoT servers.

18 Claims, 30 Drawing Sheets

(51) Int. Cl.
*H04W 8/18* (2009.01)
*H04W 84/04* (2009.01)

(58) Field of Classification Search
USPC .............................................. 455/422.1, 41.2
See application file for complete search history.

(56) References Cited

U.S. PATENT DOCUMENTS

| | | | | |
|---|---|---|---|---|
| 10,323,938 | B2* | 6/2019 | Baer | G01B 21/042 |
| 10,623,938 | B2* | 4/2020 | Tsirtsis | H04W 8/005 |
| 10,791,152 | B2* | 9/2020 | Harrison | G08C 17/02 |
| 2004/0128344 | A1* | 7/2004 | Trossen | H04L 67/51 |
| | | | | 709/227 |
| 2006/0187858 | A1* | 8/2006 | Kenichi | H04L 45/02 |
| | | | | 370/254 |
| 2007/0286100 | A1* | 12/2007 | Saaranen | H04L 67/1068 |
| | | | | 370/260 |
| 2011/0103264 | A1* | 5/2011 | Wentink | H04W 8/005 |
| | | | | 370/255 |
| 2012/0190325 | A1* | 7/2012 | Abu-Hakima | H04L 12/1895 |
| | | | | 455/404.2 |
| 2014/0064163 | A1* | 3/2014 | Tsirtsis | H04W 8/005 |
| | | | | 370/311 |
| 2014/0066058 | A1* | 3/2014 | Yu | H04W 8/005 |
| | | | | 455/434 |
| 2014/0066258 | A1* | 3/2014 | Smead | A63B 21/02 |
| | | | | 482/11 |
| 2014/0150067 | A1* | 5/2014 | Salkintzis | H04W 76/14 |
| | | | | 726/4 |
| 2015/0031359 | A1* | 1/2015 | Yu | H04W 24/08 |
| | | | | 455/434 |
| 2015/0317157 | A1* | 11/2015 | Gruber | G06F 9/3009 |
| | | | | 712/22 |
| 2016/0080925 | A1* | 3/2016 | Liao | H04W 76/14 |
| | | | | 455/434 |
| 2016/0134929 | A1* | 5/2016 | Robii | H04N 21/4508 |
| | | | | 725/81 |
| 2016/0196574 | A1* | 7/2016 | Ganesh | G06Q 30/0246 |
| | | | | 705/14.45 |
| 2016/0242027 | A1* | 8/2016 | Salkintzis | H04W 4/08 |
| 2016/0249283 | A1* | 8/2016 | Yu | H04W 24/08 |
| 2017/0150326 | A1* | 5/2017 | Hampel | H04W 72/23 |
| 2017/0264974 | A1* | 9/2017 | Harrison | H04L 61/5007 |
| 2017/0347311 | A1* | 11/2017 | Iyer | H04L 67/51 |
| 2018/0034864 | A1 | 2/2018 | Starsinic et al. | |
| 2018/0189713 | A1* | 7/2018 | Matthiesen | H04L 67/51 |
| 2019/0081992 | A1* | 3/2019 | Lin | H04L 65/1073 |
| 2019/0132930 | A1* | 5/2019 | Vangeel | H05B 47/1965 |
| 2019/0289648 | A1* | 9/2019 | Kim | H04W 8/26 |
| 2022/0022029 | A1* | 1/2022 | Di Girolamo | H04W 4/50 |

OTHER PUBLICATIONS

3rd Generation Partnership Project, "Technical Specification Group Services and System Aspects; Proximity-based services (ProSe); Stage 2 (Release 15)", 3GPP TS 23.303 V15.0.0, Jun. 2017, 130 pages.

TETRA Direct Mode and LTE Proximity Services (ProSe) compared: Will device-to-device services in LTE be equivalent to Tetra DMO?, TCCA, Aug. 2016, 17 pages.

3rd Generation Partnership Project, "Technical Specification Group Services and System Aspects; System Architecture for the 5G System; Stage 2 (Release 15)", 3GPP TS 23.501 V15.1.0, Mar. 2018, 201 pages.

3rd Generation Partnership Project, Technical Specification Group Services and System Aspects; Procedures for the 5G System; Stage 2 (Release 15), Mar. 2018, 285 pages.

oneM2M, "Functional Architecture", TS-0001, V-3.11.0, Apr. 2018, 507 pages.

* cited by examiner

DEVICE DISCOVERY AND CONNECTIVITY IN A CELLULAR NETWORK

CROSS-REFERENCE TO RELATED APPLICATIONS

This application is the National Stage Application of International Patent Application No. PCT/US2019/054698, filed Oct. 4, 2019 which claims the benefit of the filing date of U.S. provisional patent application No. 62/742,638, filed Oct. 8, 2018, titled "Device Discovery and Connectivity in A Cellular Network."

BACKGROUND

The 3rd Generation Partnership Project (3GPP) develops technical standards for cellular telecommunications network technologies, including radio access, the core transport network, and service capabilities including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G."

SUMMARY

Disclosed herein are methods and apparatus for the facilitation of social discovery and social communication among M2M/IoT devices, connected via cellular networks and, optionally, supported by various M2M/IoT servers.

In one aspect disclosed herein, a source device may be connected to a core network entity of a cellular network configured to enable a sociability service among devices connected to it, where the sociability service may comprise a social discovery service and a social communication service. The source device may transmit a request to register to the sociability service, where the request may comprise a sociability context, containing one or more social identifiers and one or more social policies of the source device. In response to the registration request, the source device may receive from the core network entity a message, which may include an indication that the source device is registered with the sociability service. The source device, then, may transmit to the core network entity a request to discover at least one device of the devices connected to the cellular network. The request may comprise one or more social markers characterizing the at least one device. Discovery may then be based on a comparison between the social markers and social identifiers of the at least one device. After performing the requested discovery, and in response to the request to discover, the core network entity may send to the source device an identity of the at least one device discovered based upon the comparison. Further aspects may include the source device transmitting to the core network entity a request to communicate with the at least one device that was discovered based upon the comparison. In response to such request to communicate, the core network entity may send to the source device a message comprising a communication configuration specifying conditions under which communication may be carried out. The communication configuration may be based on the social policy of the source device and a social policy of the at least one device that was discovered based upon the comparison.

In another aspect, an entity of a core network of a cellular network may be configured to provide a sociability service among devices connected to that cellular network. The entity may receive, from each of two or more devices in communication with the core network, a request to register the device to the sociability service. Each sociability request may comprise a sociability context, which sociability context may comprise one or more social identifiers and one or more social policies associated with the respective device. The entity may store in its memory the sociability context of the two or more devices. A first device of the two or more devices may request from the entity to discover at least one device of the two or more devices, wherein the request may comprise one or more social markers characterizing the at least one device to be discovered. In response, the entity may compare the one or more social markers to the one or more social identifiers of the two or more devices stored in the memory, and may send to the first device an identity of at least one second device of the two or more devices for which the one or more social markers in the request to discover match the one or more social identifiers of the second device. In further aspects, the entity may receive from the first device, a request to communicate with the second device. Responding to that request, the entity may send to the first device a communication configuration, based on a social policy of the first device and a social policy of the second device.

In yet another aspect, an entity of a core network of a cellular network may be configured to provide a sociability service among devices connected to that cellular network. The entity may receive, from each of two or more devices in communication with the core network, a request to register the device to the sociability service. Each sociability request may comprise a sociability context, which sociability context may comprise one or more social identifiers and one or more social policies associated with the respective device. The entity may store in its memory the sociability context of those two or more devices. A first device of the two or more devices, may send to the entity a combined request to discover at least one device of the two or more devices and to communicate to that at least one device. This combined discovery and communication request may comprise one or more social markers characterizing the at least one device to be discovered and a message to that at least one device to be discovered. In response, the entity may compare the one or more social markers to the one or more social identifiers of each of the two or more devices stored in its memory. Upon finding an identity of a second device of the two or more devices for which the social marker(s) in the request of the first device match the social identifier(s) of the second device, the entity may send the message from the first device to that identified second device.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION

Figure 1:
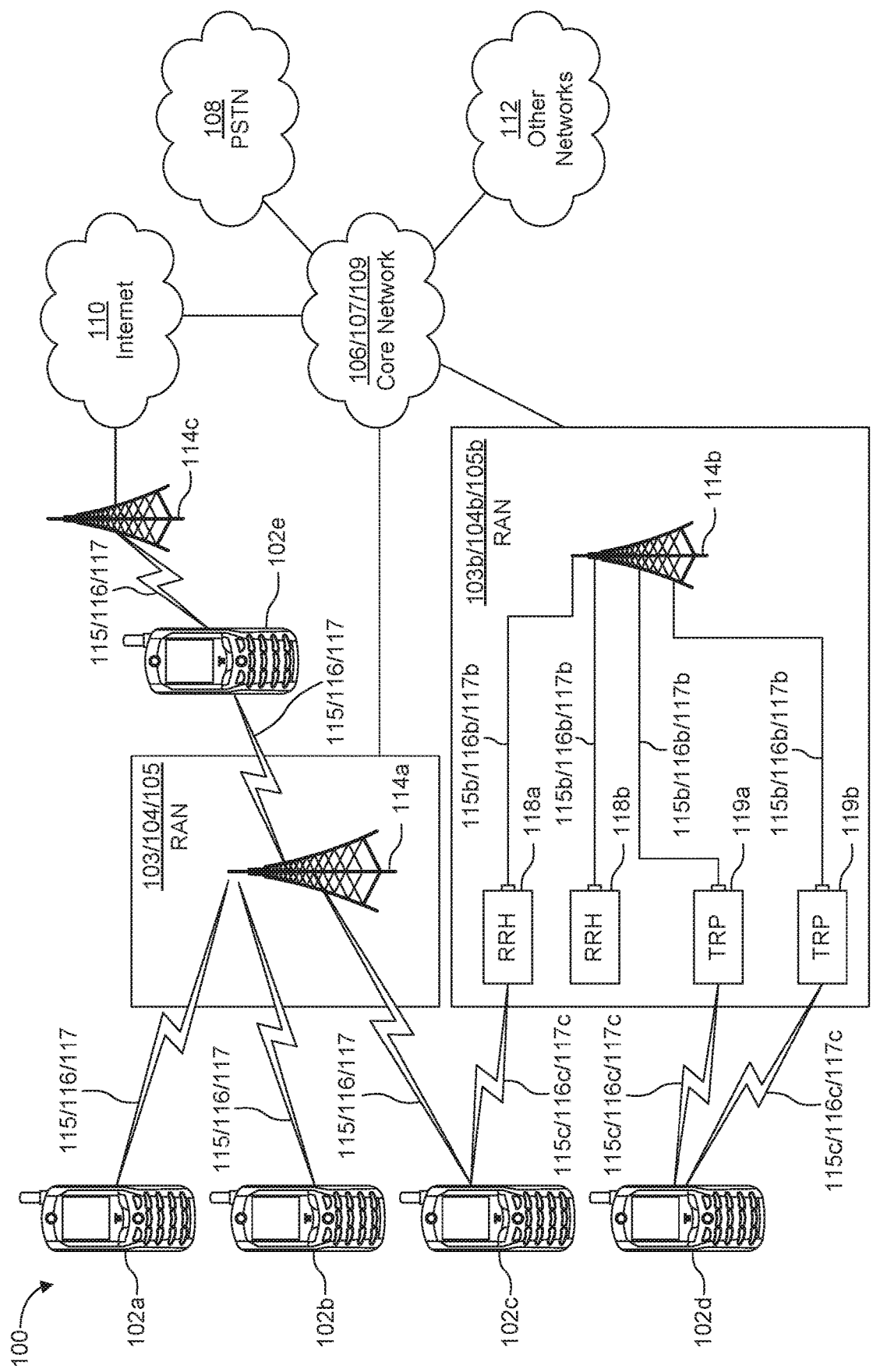
FIG. 1 illustrates an example communications system.

The following is a list of acronyms that may appear in the following description. Unless otherwise specified, the acronyms used herein refer to the corresponding terms listed below:

5GC 5G Core
5GS 5G System
AE Application Entity
AF Application Function
5G-GUTI 5G Globally Unique Temporary Identifier
5G-TMSI 5G Temporary Mobile Subscriber Identity
AS Application Server
AMF Access and Mobility Management Function
CN Core Network
CSE Common Services Entity
DN Data Network
DNN Data Network Name
EPC Evolved Packet Core
EPS Evolved Packet System
GPSI Generic Public Subscription Identifier
GUID Globally Unique Identifier
GUTI Globally Unique Temporary UE Identity
HPLMN Home PLMN
HSS Home Subscriber Server
IE Information Element
IMEI International Mobile Equipment Identity
IMSI International Mobile Subscriber Identity
IP Internet Protocol
IoT Internet of Things
LTE Long Term Evolution
M2M Machine to Machine
MME Mobility Management Entity
MSISDN Mobile Station Integrated Services Digital Network
NAS Non-Access Stratum
NEF Network Exposure Function
PDU Packet Data Unit
PEI Permanent Equipment Identifier
PLMN Public Land Mobile Network
RAN Radio Access Network
RRC Radio Resource Control
RSS Relative Signal Strength
RSU Remote Side Unit
SCEF Service Capability Exposure Function
SCS Service Capability Server
SEPP Security Edge Protection Proxy
SIB System Information Block
SMS Short Message Service
SSF Sociability Service Function
SUCI Subscription Concealed Identifier
SUPI Subscription Permanent Identifier
TMSI Temporary Mobile Subscriber Identity
UDM Unified Data Management
UDR Unified Data Repository
UE User Equipment
UDSF Unstructured Data Storage Function
UUID Universally Unique Identifier
URI Uniform Resource Identifier
VIN Vehicle Identification Number
VPLMN Visited PLMN The following terms may have the following meanings:

"Social" refers to the ability of an application on an M2M/IoT device to indicate whether it agrees for an application on another "stranger" M2M/IoT device, with which it has no prior relationship, to start a communication session with it. Once M2M/IoT devices have agreed to be social, they can rely on 3GPP Proximity Services to discover each other and establish communication. As 3GPP Proximity Services are currently defined, the assumption is that the devices involved have already implicitly agreed to be social.

"Cellular Connectivity" refers to the ability of a device to communicate over a cellular network. This may be over uplink or downlink mechanisms or through sidelink (e.g., ProSe PC5) mechanisms.

A "Communication Session" refers to a link between two devices. The link may be over communication links such as a 3GPP network, a 3GPP direct communication link, or a WiFi link.

A "device" versus a "user equipment" (UE): A device refers to a physical entity that may include one or more applications and at least one UE. UE refers to a component within a device that provides the device the capability to send and receive control or data plane messages over the cellular network, as well the capability to send and receive control or data plane messages over a device-to-device link (e.g., a 3GPP sidelink or a WiFi direct link). The device has an internal interface between the one or more applications and the at least one UE. For example, such interface may be through ATtention (AT) commands.

A "Global Identifier" or a "Unique Identifier" refers to a social identifier of a device which is globally unique (such as VIN for a device associated with a vehicle).

A "Non-unique Identifier" refers to a social identifier of a device which is not unique (such as a Blue Honda Accord for a device associated with a vehicle).

An "Intra-CN PDU Session" refers to a PDU session that stays within the cellular network operator domains. The session may extend from one core network to another, but does not let traffic flow in an external data network.

An "M2M/IoT Application" refers to an application that resides within a device and that 1) uses a cellular network for connectivity services; or 2) uses an M2M/IoT server for specialized M2M services such as access control and data storage. An M2M/IoT application may be social—willing to initiate a communication session with another device even if the two devices have no prior relationship.

An "M2M/IoT Server" refers to an infrastructure node that offers M2M services to M2M/IoT devices. These services may reduce the burden on M2M/IoT applications, including services such as discovery and access control. OneM2M IN-CSE is an example of an M2M/IoT Server that follows the oneM2M standard. 3GPP refers to such an entity as a Service Capability Server (SCS), an Application Function (AF), or an Application Server (AS).

A "Sociability Registration" refers to a procedure by which an M2M/IoT application registers its desire to be social. As part of this registration, the M2M/IoT application may provide a social context that may include social identifiers and a social policy (e.g., a list of social preferences or permissions).

A "Sociability Service Function" (SSF) refers to a virtual function that manages sociability services—carries out social registration of the applications and devices and makes sociability decisions.

A "Social Device" or a "Social Application" refers to a device or an M2M/IoT application, respectively, that is social. Meaning, the device, through the application, allows itself to be contacted by other devices, through their applications, with which it did not have any prior relationship. Note that a social application may also refer to some logic/functionality in the social device that is managed by a control plane layer within the UE (for example, at the NAS layer or RRC layer).

A "Default Social Application" refers to a social application on the device that handles incoming social communication requests that are not destined to a particular application. Based on the context of the request, the default social application may forward the request to other applications.

A "Social Identifier" refers to information or an attribute used for identification of an object associated with a device or an application on the device. For example, if the object associated with the device is a car, a Social Identifier may be the license plate number. Social Identifiers may be Global or Unique Identifiers or may be Non-unique Identifiers.

"Social Markers" refer to attributes of objects associated with social devices that may be observed or measured by, for example, cameras, scanners, or any other sensors. These markers may be used for matching between the objects associated with the social devices. Social markers may be "wireless" or "physical". For example, physical markers may include the type of the object associated with the device (e.g., a truck, a car, a robot, a smart lamppost). If the object type is a car, then physical markers may include its license plate number, VIN, route number, or color. Wireless markers, for example, may include data about the object associated with the device, such as: location (e.g., address, cell identity, tracking area), activity (e.g., on/off), route, speed, transmission frequency of the device, or IDs that may be broadcast by the device. Note that the social identifiers and the social markers are comparable type of data. When a target device executes a social registration, it provides the core network with a list of social identifiers—attributes that can be observed by other devices. When a source device wants to discover that target device, it observes the target device and measures its social markers. These social markers are then supplied to the core network, so they can be matched with the social identifiers of that target device.

"Social Preferences" and "Social Permissions" are "social policies" of a source device and a target device, respectively, which include conditions under which these devices are social—i.e., communicate with each other. The conditions may be based on a time limitation, for example, only be social from 8 AM to 9 AM, or may be based on a location, for example, only be social when the target device is on Highway 25.

"Social Discovery" refers to a method where a social device discovers the identity of another social device in order to initiate a communication session.

"Social Communication" refers to the exchange of packets/information between two devices that do not necessarily know of each other. Similar to two strangers talking to each other at a party, in the context of devices, social communication occurs when applications on the respective devices (who don't know of each other) begin communication with each other. Typically, the social communication is established after a social discovery. The exchange of packets/information may be configured over a 3GPP network, over a 3GPP direct link, or over WiFi link.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G." 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that New Radio (NR) is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 1 illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 1-6 as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to interface via a wired and/or wireless communication link with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1 may be configured to communicate with the base station 114a, which may employ a cellular-based radio technology, and with the base station 114c, which may employ an IEEE 802 radio technology.

Figure 2:
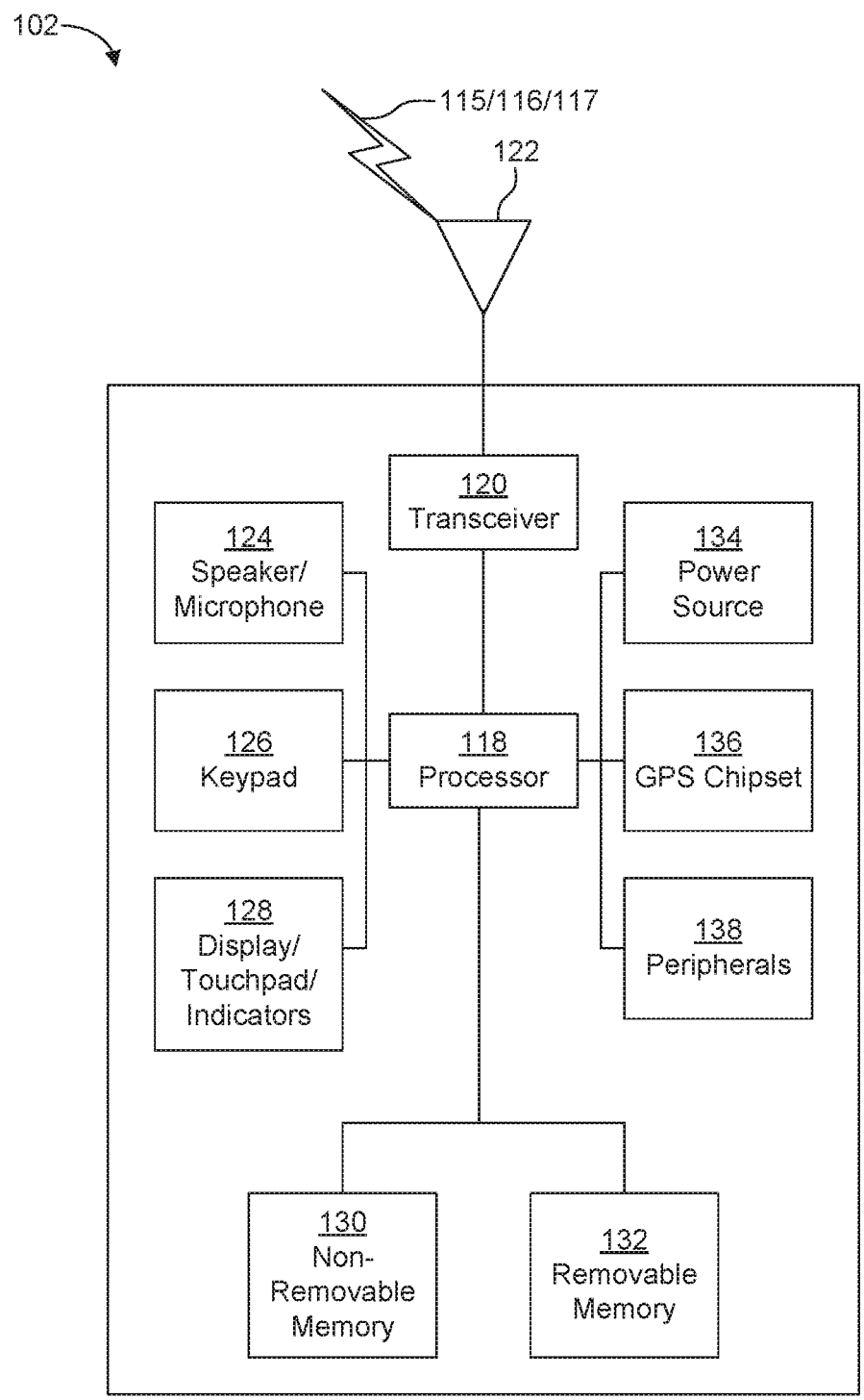
FIG. 2 is a block diagram of an example apparatus or device configured for wireless communications such as, for example, a wireless transmit/receive unit (WTRU)

FIG. 2 is a block diagram of an example apparatus or device configured for wireless communications in accordance with the embodiments illustrated herein, such as for example, a WTRU 102. As shown in FIG. 2, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 2 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In one implementation, an M2M/IoT Application may run on one microprocessor and a communication module (e.g., executing the 3GPP stack) may run on a second microprocessor. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 2 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 3:
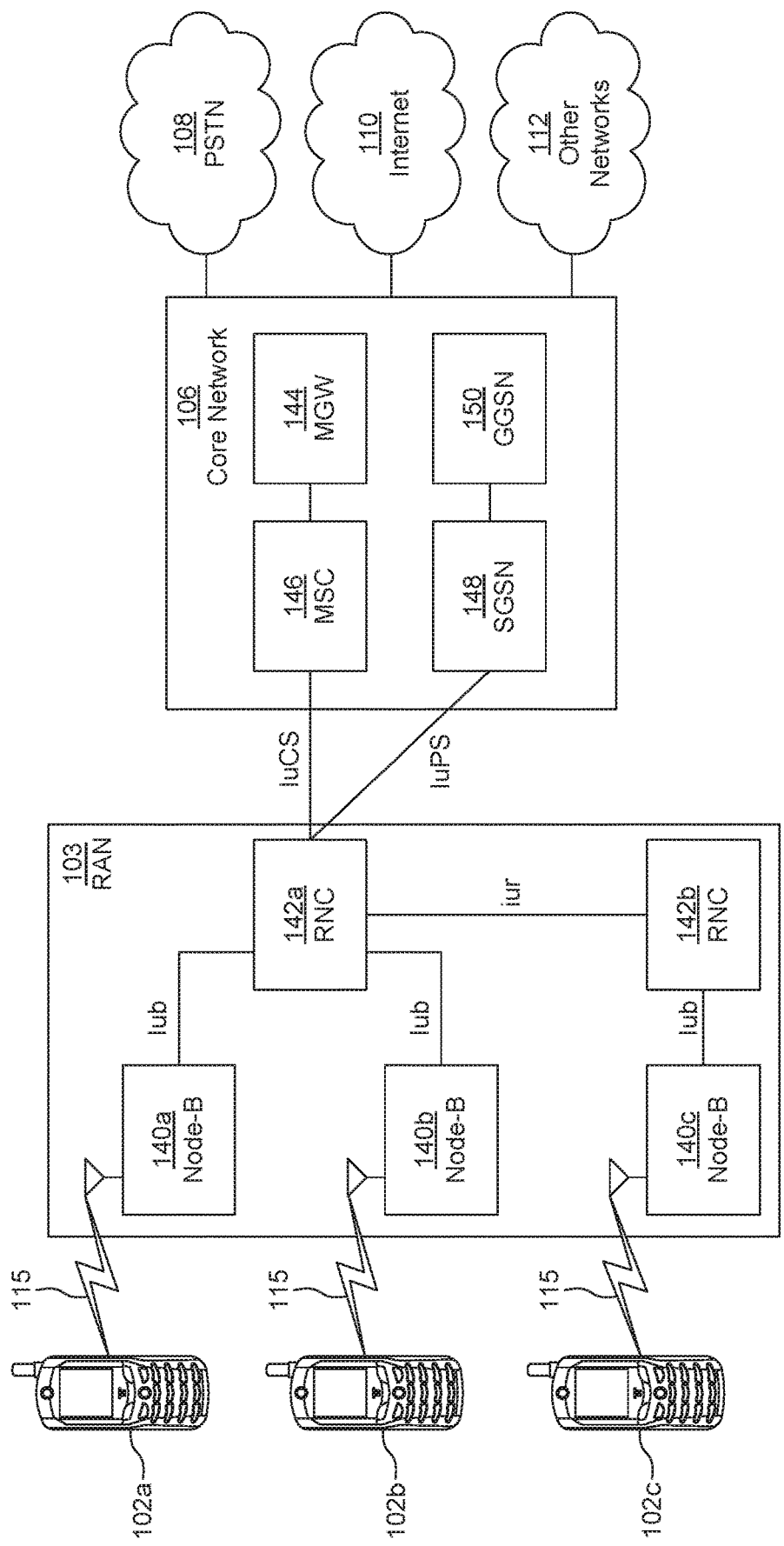
FIG. 3 is a system diagram of a first example radio access network (RAN) and core network.

FIG. 3 is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 3, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 3, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 3 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 4:
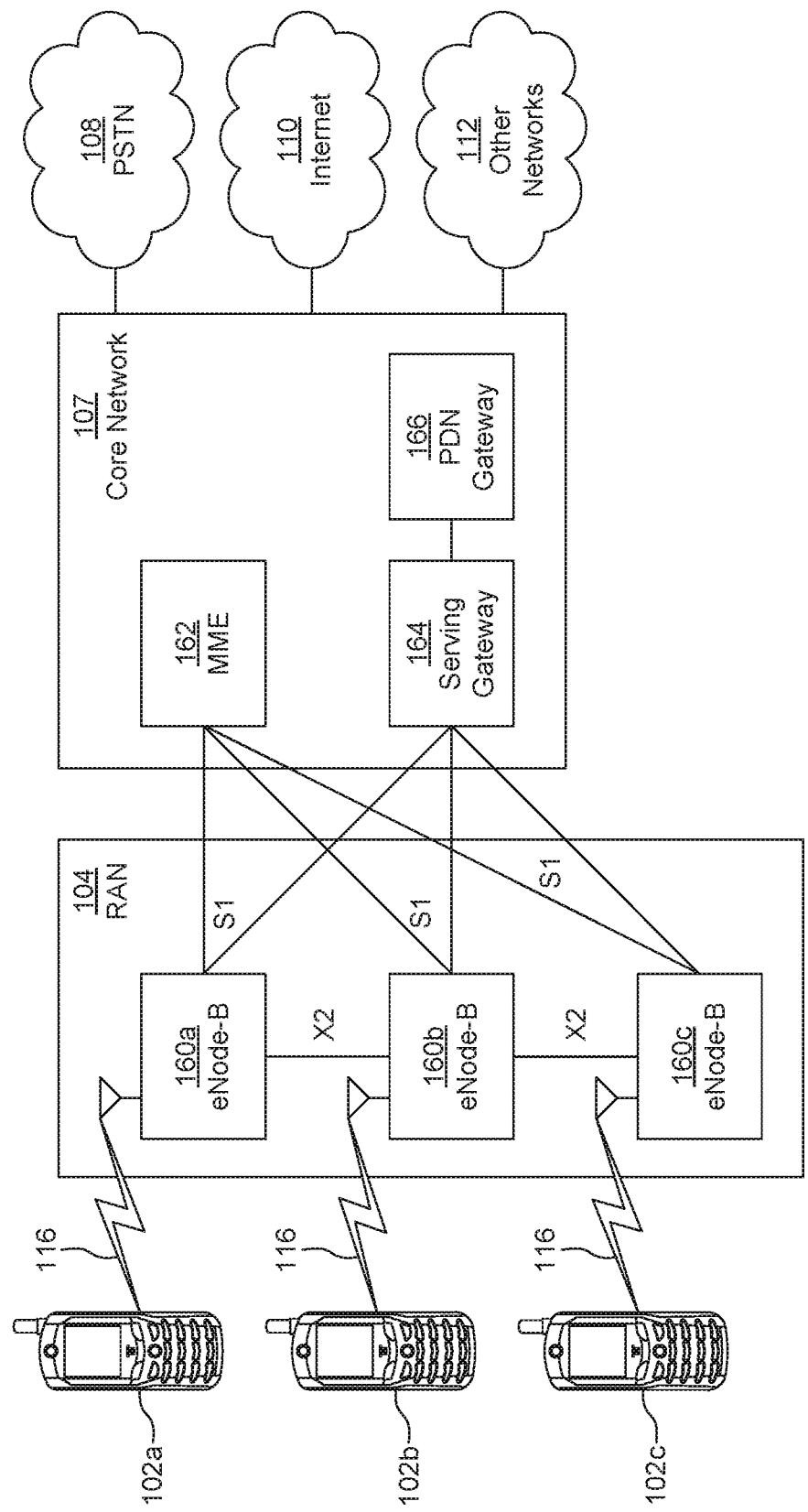
FIG. 4 is a system diagram of a second example RAN and core network.

FIG. 4 is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 4, the eNode-Bs 160a, 160b, 160c may communicate with one another over an X2 interface.

The core network 107 shown in FIG. 4 may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 5:
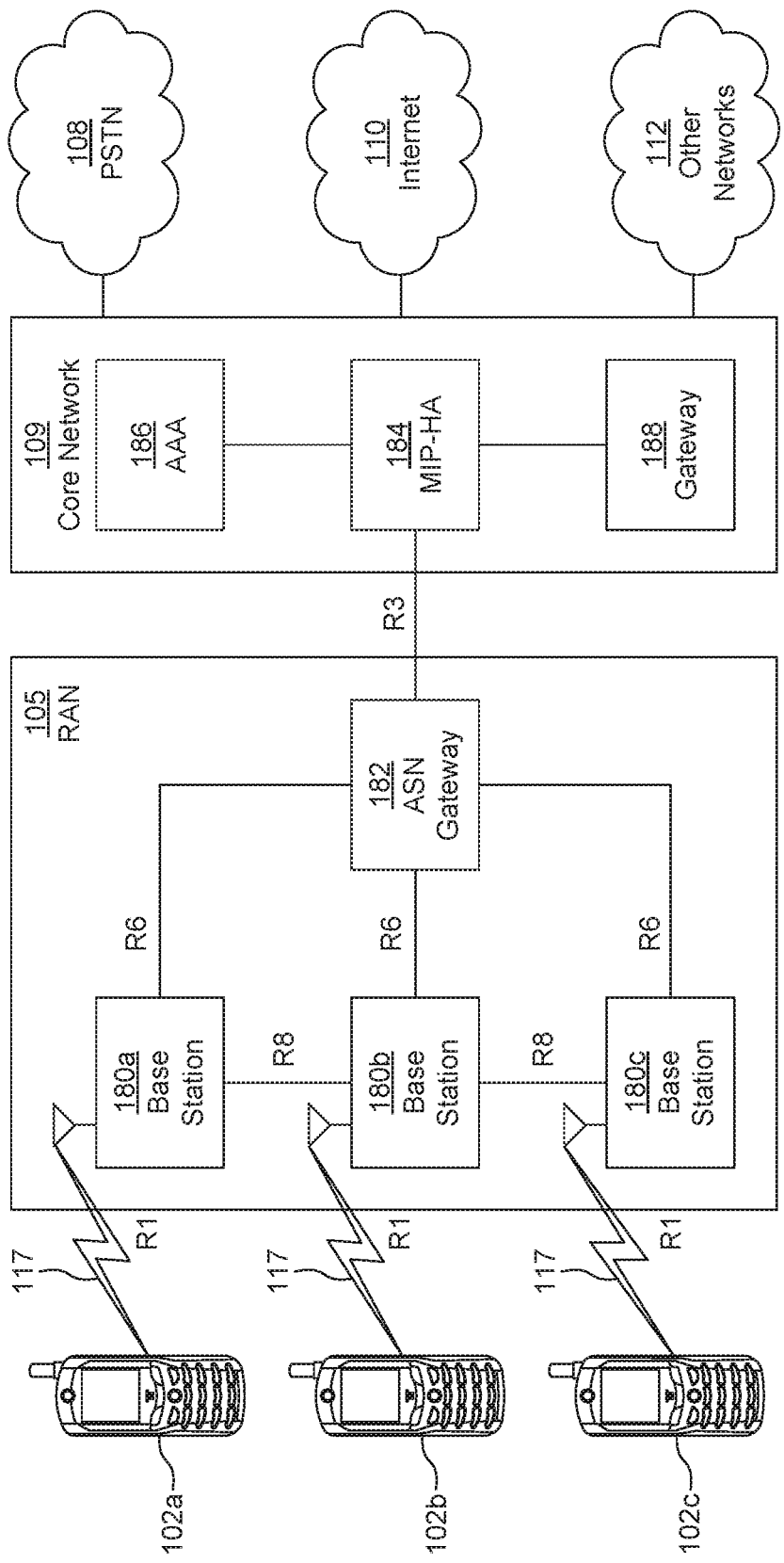
FIG. 5 is a system diagram of a third example radio access network RAN and core network.

FIG. 5 is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 5, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 5, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 5, it will be appreciated that the RAN 105 may be connected to other ASNs and the core network 109 may be connected to other core networks. The communication link between the RAN 105 and the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1-6 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1-6 are provided by way of example only, and it is understood that the subject matter disclosed and claimed herein may be embodied or implemented in any similar communication system, whether presently defined or defined in the future.

Figure 6:
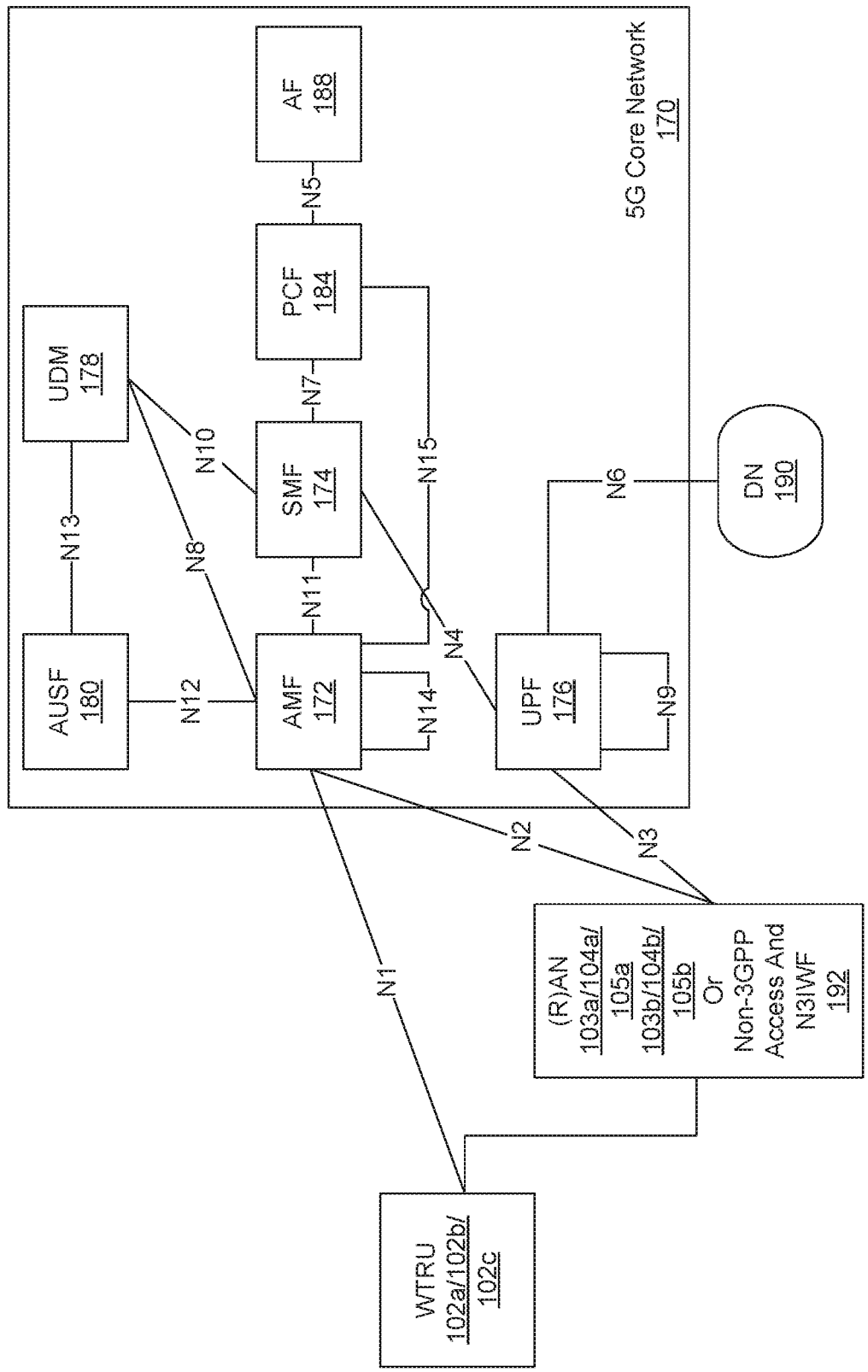
FIG. 6 is a system diagram of a fourth example radio access network RAN and core network.

The 5G core network 170 shown in FIG. 6 may include an access and mobility management function (AMF) 172, a session management function (SMF) 174, a user plane function (UPF) 176, a user data management function (UDM) 178, an authentication server function (AUSF) 180, a Network Exposure Function (NEF), a policy control function (PCF) 184, a non-3GPP interworking function (N3IWF) 192 and an application function (AF) 188. While each of the foregoing elements are depicted as part of the 5G core network 170, it will be appreciated that any one of these elements may be owned and/or operated by an entity other than the core network operator. It should also be appreciated that a 5G core network may not consist of all of these elements, may consist of additional elements, and may consist of multiple instances of each of these elements. FIG. 6 shows that network functions directly connect to one another, however, it should be appreciated that they may communicate via routing agents such as diameter routing agents or message buses.

The AMF 172 may be connected to each of the RAN 103a/104a/105a/103b/104b/105b via an N2 interface and may serve as a control node. For example, the AMF 172 may be responsible for registration management, connection management, reachability management, access authentication, access authorization. The AMF 172 may generally route and forward NAS packets to/from the WTRUs 102a, 102b, 102c.

The SMF 174 may be connected to the AMF 172 via an N11 interface, maybe connected to a PCF 184 via an N7 interface and may be connected to the UPF 176 via an N4 interface. The SMF 174 may serve as a control node. For example, the SMF 174 may be responsible for Session Management, WTRUs 102a, 102b, 102c IP address allocation & management and configuration of traffic steering rules in the UPF 176, and generation of downlink data notifications.

The SMF 174 may also be connected to the UPF 176, which may provide the WTRUs 102a, 102b, 102c with access to a data network (DN) 190, such as the Internet 110, to facilitate communications between the WTRUs 102a, 102b, 102c and IP-enabled devices. The SMF 174 may manage and configure traffic steering rules in the UPF 176 via the N4 interface. The UPF 176 may be responsible for interconnecting a packet data unit (PDU) session with a data network, packet routing and forwarding, policy rule enforcement, quality of service handling for user plane traffic, and downlink packet buffering.

The AMF 172 may also be connected to the N3IWF 192 via an N2 interface. The N3IWF facilities a connection between the WTRUs 102a, 102b, 102c and the 5G core network 170 via radio interface technologies that are not defined by 3GPP.

The PCF 184 may be connected to the SMF 174 via an N7 interface, connected to the AMF 172 via an N15 interface, and connected to an application function (AF) 188 via an N5 interface. The PCF 184 may provide policy rules to control plane nodes such as the AMF 172 and SMF 174, allowing the control plane nodes to enforce these rules.

The UDM 178 acts as a repository for authentication credentials and subscription information. The UDM may connect to other functions such as the AMF 172, SMF 174, and AUSF 180.

The AUSF 180 performs authentication related operations and connects to the UDM 178 via an N13 interface and to the AMF 172 via an N12 interface.

The NEF exposes capabilities and services in the 5G core network 170. The NEF may connect to an AF 188 via an interface and it may connect to other control plane and user plane functions (180, 178, 172, 172, 184, 176, and N3IWF) in order to expose the capabilities and services of the 5G core network 170.

The 5G core network 170 may facilitate communications with other networks. For example, the core network 170 may include, or may communicate with, an IP gateway (e.g., an IP multimedia subsystem (IMS) server) that serves as an interface between the 5G core network 170 and the PSTN 108. For example, the core network 170 may include, or communicate with a short message service (SMS) service center that facilities communication via the short message service. For example, the 5G core network 170 may facilitate the exchange of non-IP data packets between the WTRUs 102a, 102b, 102c and servers. In addition, the core network 170 may provide the WTRUs 102a, 102b, 102c with access to the networks 112, which may include other wired or wireless networks that are owned and/or operated by other service providers.

Figure 7:
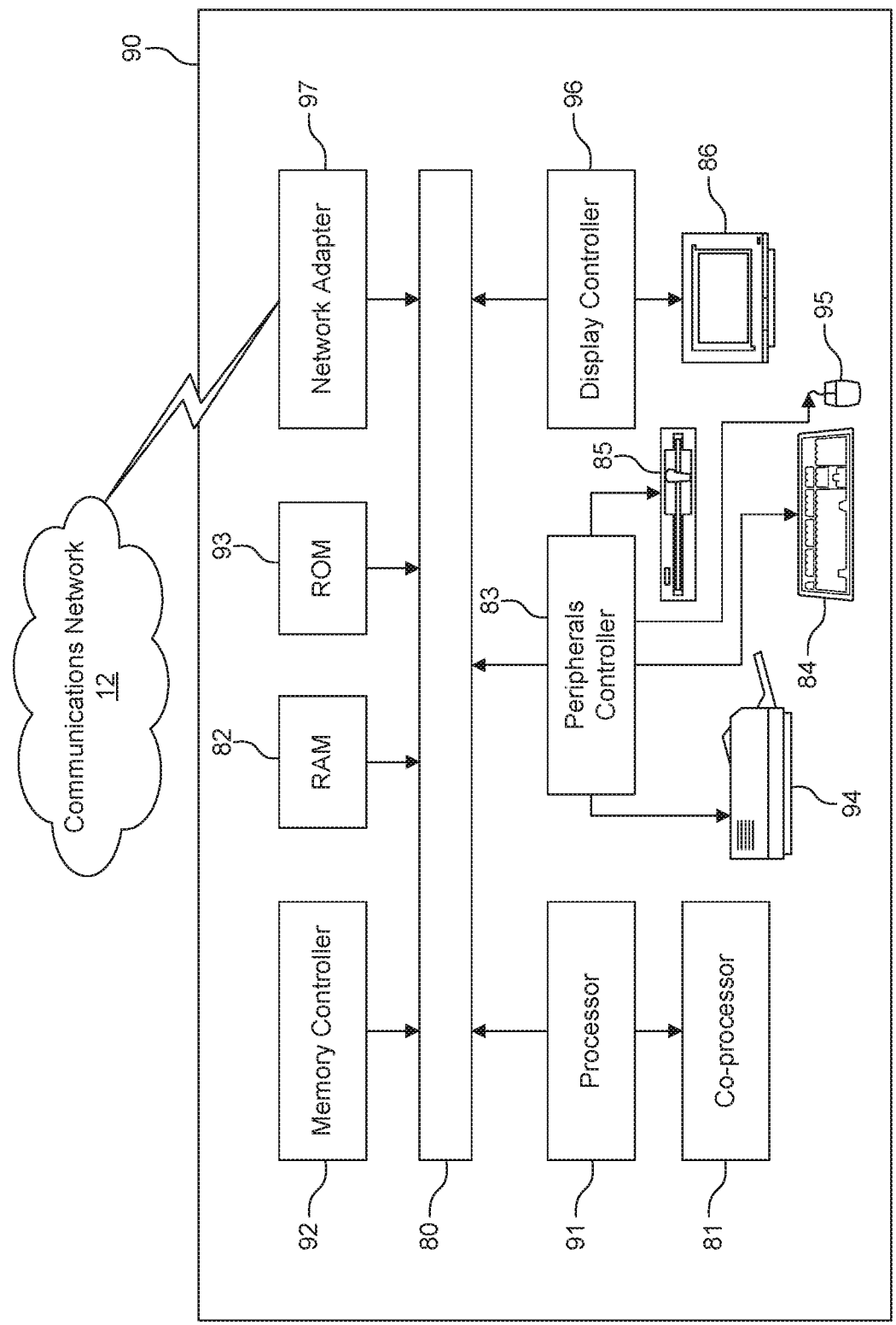
FIG. 7 is a block diagram of an example computing system in which a node of a communication system may be embodied.

FIG. 7 is a block diagram of an exemplary computing system 90 in which one or more apparatuses of the communications networks illustrated or described herein may be embodied, such as certain nodes or functional entities in the RAN 103/104/105, Core Network 106/107/109, PSTN 108, Internet 110, or Other Networks 112.

Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1-6, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 8:
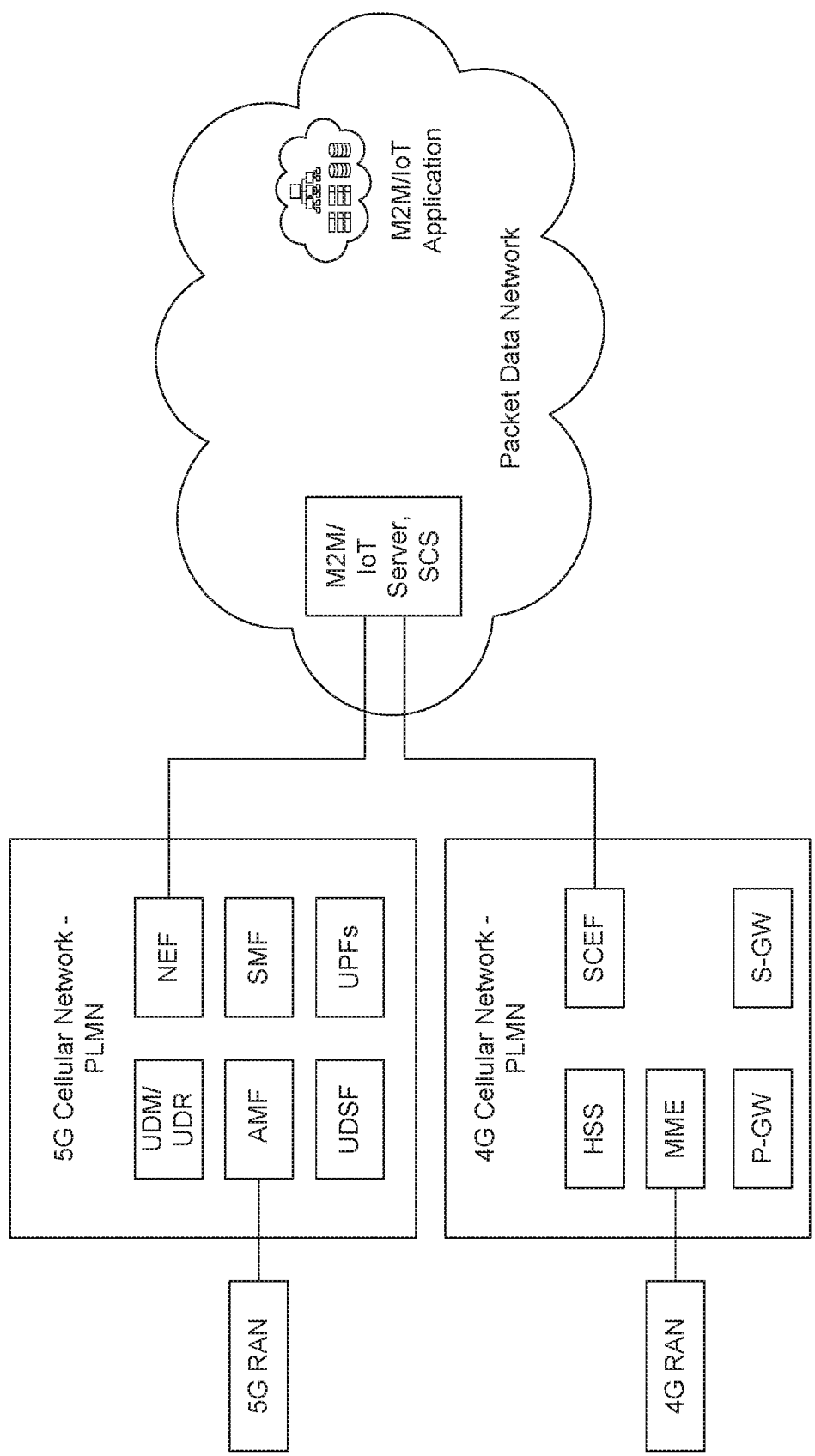
FIG. 8 is a system diagram of an example of a 4G cellular network and a 5G cellular network.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system. FIG. 8 shows cellular network entities and cellular network functions in which the methods and apparatuses disclosed and claimed herein may be embodied. These entities are described below.

A Mobility Management Entity (MME) is an entity within a 4G cellular network that may manage registration, mobility, and UE reachability in IDLE mode. It may also be involved with authentication and authorization. Similarly, an Access and Mobility Management Function (AMF) is an entity within a 5G cellular network that may handle registration, connection, mobility, and reachability management. It may also be involved with security: access authentication, access authorization, and deriving the access network specific keys.

A Home Subscriber Server (HSS) is an entity within a 4G cellular network that stores subscription information for the connecting devices. The subscription information includes the subscriber identity (i.e., an IMSI) and security keys used for authentication, encryption, and data integrity. The HSS may also include other parameters associated with the subscription, including the services that may be accessed, the corresponding available quality of those services, the access technologies they may use, and the charging model. Herein, the term HSS may include functionality of the Authentication Center (AuC). However, such functionality may be in a separate entity. Likewise, a Unified Data Management (UDM) is an entity within a 5G cellular network that stores subscription information for the connecting devices. In some cases, the operator subscription information may be stored in a Unified Data Repository (UDR) and the UDM may then serve to retrieve that subscription data from the UDR.

A Service Capability Exposure Function (SCEF) is an entity within a 4G cellular network that exposes the services and capabilities provided by 3GPP network interfaces. It allows for 3rd party applications, for instance, to determine UE reachability, set up the monitoring of network events, or permit group message delivery. Similar to the SCEF, a Network Exposure Function (NEF) is an entity that exposes services and capabilities provided by a 5G 3GPP network. It affords a 3rd party's applications with means to provide information to the cellular network (for example mobility or communication patterns).

A UDSF is a 5G network function that may be used to store unstructured data from any other network function. UDSF belongs to the same PLMN where the network function that uses it is located. UDSF typically stores UE context that is needed by a network function. UPFs are entities that handle user plane functionality. They provide functionality such as lawful intercept, packet routing, packet filtering, packet verification, and policy rule enforcement. Some UPF entities may act as anchors to a PDU session. Similarly, in a 4G network, P-GW and S-GW are gateway functions that may provide user plane functionality. S-GW may provide a mobility anchor for a UE. P-GW may provide IP address allocation. These gateways may also provide lawful intercept, packet routing, and policy rule enforcement.

5G-RAN is a 5G Radio Access Network that is used to access the 5G Core Network, for example, New Radio (NR) or Wi-Fi. Similarly, 4G-RAN is a 4G Radio Access Network that is used to access the 4G Core Network, for example, LTE (Long Term Evolution) or Wi-Fi.

Note that figures and corresponding descriptions in this disclosure, for simplicity of the presentation, may refer to only 5G network (or 4G network) entities and functions, as described above in reference to FIG. 8. It should be understood that figures and corresponding descriptions in this disclosure may also apply to the corresponding 4G network (or 5G network) entities and functions.

4G or 5G Devices may be identified by one or more of the following identifiers. The first identifier may be a Static Public IP address that may be statically assigned to a cellular device by a network operator. The IP address may be part of the UE's subscription information and as such may be included in the HSS/UDM entities. The second identifier may be a Subscription Permanent Identifier (SUPI). SUPI is a globally unique identifier that may be allocated to each subscriber in a 5G System and provisioned in the UDM/UDR. The SUPI may be used within a 3GPP system and may contain the address of the home network that assigned it. The third identifier may be an International Mobile Subscription Identity (IMSI). IMSI is a globally unique identifier that may be allocated to a subscriber of a 3GPP system and may contain a PLMN ID. The fourth identifier may be a Subscription Concealed Identifier (SUCI). SUCI is a privacy preserving identifier containing a concealed SUPI. The fifth identifier may be a Permanent Equipment Identifier (PEI) that is an identifier for the device hosting the UE and providing service to the subscriber.

Another identifier to a 4G or 5G Device may be an International Mobile Equipment Identity (IMEI). IMEI is a unique number that identifies a cellular phone or a device, therefore, it may not be tied to the subscriber of the device. However, the cellular network may store the IMEI associated with each subscriber's IMSI.

The 5G Globally Unique Temporary Identifier (5G-GUTI) is a 5G identification of the UE that may be assigned by the AMF. It may allow for unambiguous identification of the UE and its serving AMF. 5G-GUTI may consist of GUAMI and 5G-TMSI identifiers. The GUAMI may identify the assigned AMF, and the 5G-TMSI may uniquely identify the UE within the AMF (containing a PLMN ID). Likewise, the Globally Unique Temporary Identifier (GUTI) is a 4G identification of the UE that may be assigned by the MME. It may allow for unambiguous identification of the UE and its serving MME. GUTI may consist of GUMMEI and M-TMSI identifiers. The GUMMEI may identify the assigned MME, and the M-TMSI may uniquely identify the UE within the MME (containing a PLMN ID).

Figure 9:
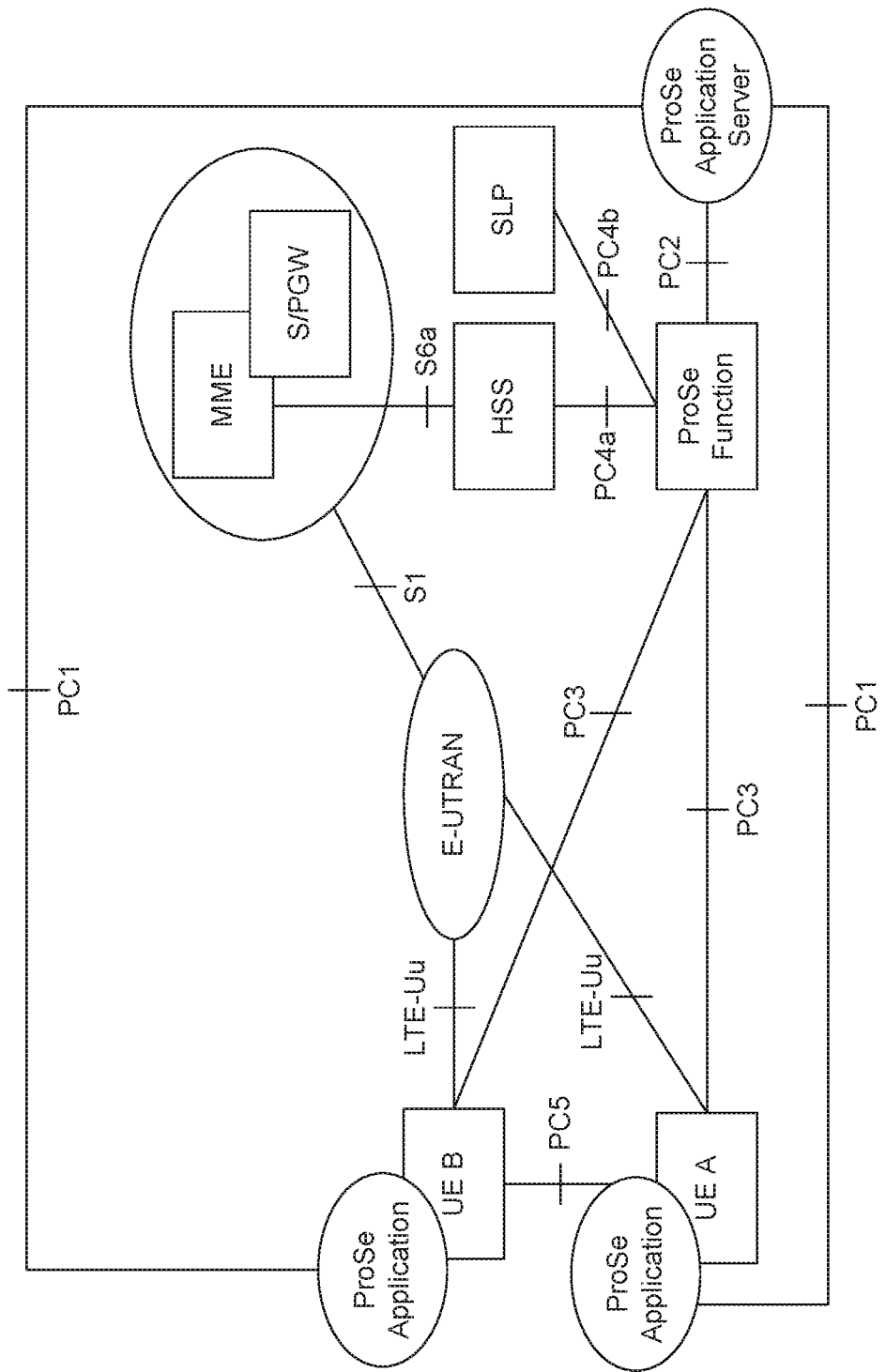
FIG. 9 is a block diagram of an example ProSe reference architecture.

3GPP supports Proximity Services (ProSe). ProSe may be provided when UEs are located in the vicinity of each other, within the wireless communication range. 3GPP defined these services as part of LTE Release 12, and subsequently enhanced those definitions in Release 13. FIG. 9 illustrates a ProSe reference architecture. Therein, the ProSe Function is the logical function that is used by ProSe for network related actions. The ProSe Function may be responsible for provisioning the UE with necessary parameters used with ProSe Direct Discovery and ProSe Direct Communication (these ProSe's two main services described in detail below). The ProSe Function may be used to provision the UEs with PLMN specific parameters that may allow the UEs to use ProSe in this specific PLMN. For direct communication used for Public Safety, the ProSe Function also may provision the UEs with parameters that are needed when the UEs are not served by an E-UTRAN cell. In that case, the UEs may be pre-provisioned with all the radio parameters so that they may begin a ProSe Direct Communication.

As shown in FIG. 9, PC3 may be the reference between the UE and the ProSe Function. This reference point may rely on the EPC user plane transport for transfer of information. As a result, the UE may know the IP address of the ProSe Function (e.g., either pre-provisioned in the UE or discovered through a DNS query) and, hence, it may interact with the ProSe Function using that IP, for example, through HTTP exchanges. PC5 may be the reference point between ProSe enabled UEs. It may be used for sending control and user plane traffic directly between the UEs. The lower layer aspects of this reference point may be referred to as the sidelink (in contrast to uplink or downlink). Communication over the sidelink may be via provisioned radio resources. Under E-UTRAN coverage, these provisioned resources may be taken from the E-UTRAN uplink resources.

ProSe may offer two main services: ProSe Direct Discovery and ProSe Direct Communication. The ProSe Direct Discovery may identify that two UEs are in proximity to each other. It may be used for public safety applications as well as non-public safety application (such as commercial applications). ProSe Direct Communication may reserve LTE resources so that two or more UEs may communicate directly over these reserved resources. ProSe Direct Communication may occur even if one UE or both of these UEs is out of LTE coverage.

The first main service, ProSe Direct Discovery, may allow for two models of discovery: Model A and Model B. In Model A, ProSe enabled UEs may be either Announcing UEs or Monitoring UEs. The Announcing UEs announce (broadcast) information that they want to have discovered (announcing "I am here"). The Monitoring UEs listen for information of interest. When a Monitoring UE finds broadcast information that is of interest, it essentially "discovered" an Announcing UE. The whole process may be facilitated through the ProSe Function. The Announcing UE first registers its interest to announce something. It may provide an indication of the type of information it may want to announce. The ProSe Function may then check if the UE is allowed to announce, and, if so, it may return a code indicating that the UE can broadcast. This code may represent the information that the UE wants to announce. In a similar procedure, the Monitoring UE may first register its interest to monitor something. It may provide an indication of the type of information it wants to monitor. The ProSe Function may then check if the UE is allowed to monitor, and, if so, it may return a mask that represents the information to be monitor. Once this procedure is completed, the Announcing UE may begin broadcasting its code on PC5. The monitoring UE may begin listening to PC5, and it may attempt detecting a match between any broadcast code and its mask. If a match had been found, the monitoring UE has "discovered" a UE that is broadcasting the information that it is interested in. On the other hand, in Model B, ProSe enabled UEs may be either Discoverer UEs or Discoveree UEs. The Discoverer UE may transmit requests asking for certain information that it may want to discover (asking "who is there"). The Discoveree UE may receive these requests and then may respond if it has the information that was requested. As with Model A, the entire process may be facilitated through the ProSe Function.

The second main service, ProSe Direct Communication or One-to-one ProSe Direct Communication, may be realized by establishing a secure Layer-2 link over PC5 between two UEs. Each UE may have a Layer-2 ID for unicast communication that may be included in the Source Layer-2 ID field of frames that it sends on the Layer-2 link and in the Destination Layer-2 ID of frames that it receives on the Layer-2 link. In order to initiate a one-to-one communication, the UE initiating the communication may need to know the Layer-2 ID of the peer, typically provided by the ProSe Direct Discovery service described above.

M2M/IoT Servers may provide additional services to M2M/IoT devices and applications therein, reducing the burden on them by making available a host of functions such as data storage, data advertising, and access control. M2M/IoT servers may also interface with underlying transport networks, such as 3GPP core networks. This interface may be through an exposure function (NEF/SCEF). 3GPP typically refers to the M2M/IoT Server as a Service Capability Server. In addition to getting information from the 3GPP cellular network (e.g., monitoring of certain events), M2M/IoT Servers may also provide assistance to the 3GPP core network. For example, they may provide background data traffic or tell the network about a UE's traffic patterns.

OneM2M is currently standardizing M2M/IoT Servers, referring to them as Infrastructure Capability Service Entities (IN-CSE). The oneM2M standard was designed following RESTful principles. As a result, the oneM2M system is implemented through resources. These resources may have one or more child resources. Hence, services may be triggered by actions on these resources (actions such as create, retrieve, update, delete, and notify) as well as the child-parent relationships between these resources.

Applications in M2M/IoT devices, referred to as Application Entities (AEs) in oneM2M, may use specialized types of resources and resource relationships to implement certain services. Examples of such resources may be: 1) container resources that are used to store data generated from an application resource; 2) accessControlPolicy resources that may be linked to a container resource and that may be used to define the access control policy of the container resource; or 3) subscription resources, children of a container resource, that may be used to start a service to monitor the container resource, including notifying some entity if there is a change in the container resource, where a change could be that an application added new data, deleted existing data, or modified existing data. In order for two applications, e.g., App1 and App2, to be able to exchange data with each other using a oneM2M compliant M2M/IoT server, the following steps may be required:

App1 and App2 have to be registered to the M2M/IoT Service or Service Layer;

App1 has to create a container resource (container1) on the M2M/IoT Server and allow App2 access rights;

App2 has to create a container resource (container2) on the M2M/IoT server and allow App1 access rights;

App1 has to subscribe to be notified if there is a new data entry in container2; and App2 has to subscribe to be notified if there is a new data entry in container1.

Figure 10:
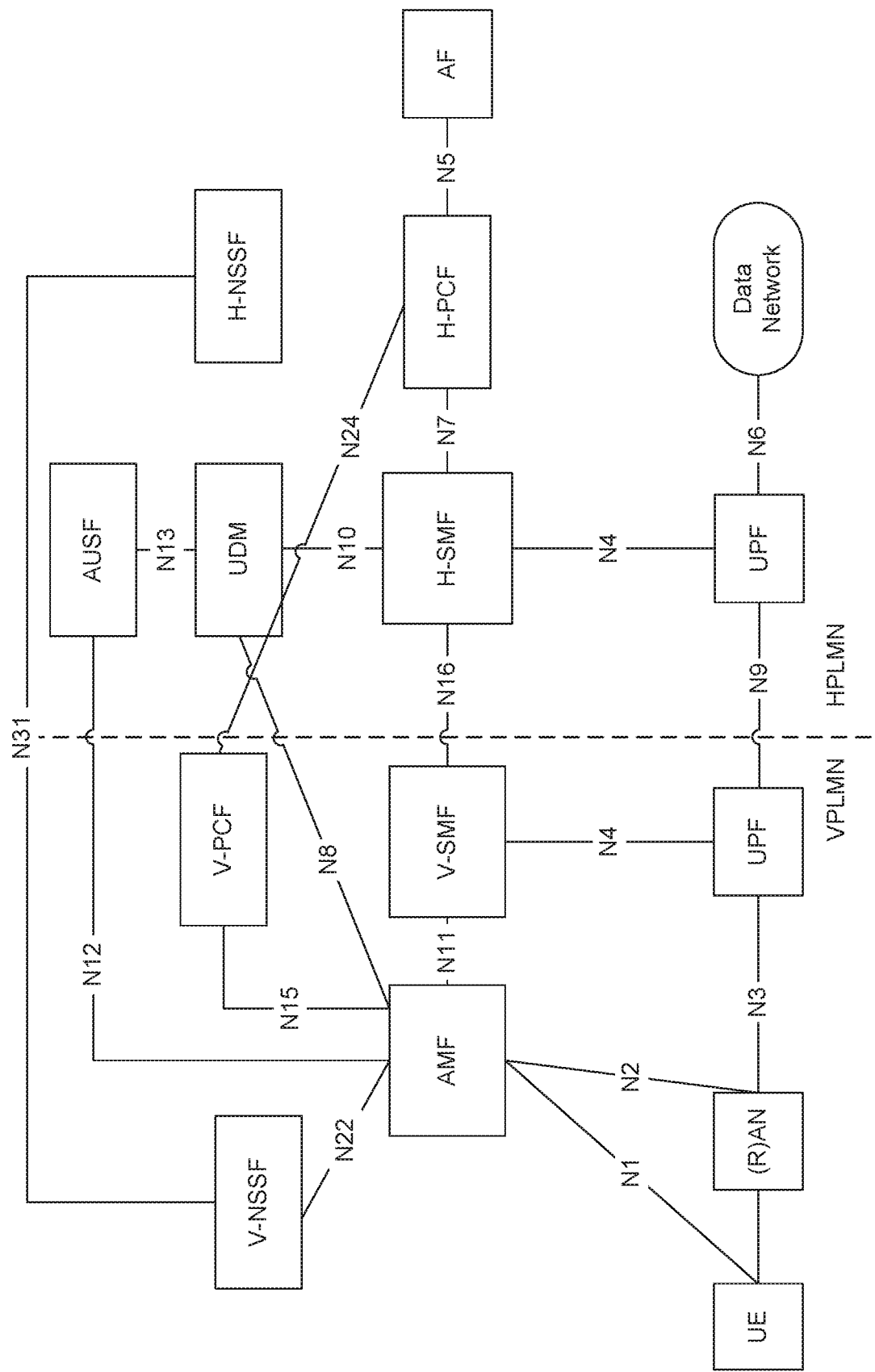
FIG. 10 is a block diagram of an example home routed 5G core network architecture.

The home routed 5G core network architecture is shown in FIG. 10. Note that therein the control plane functionality and the user plane functionality are split. The SMFs may use the N4 interface to configure or provision the UPFs (in both the visited and home networks).

Figure 11:
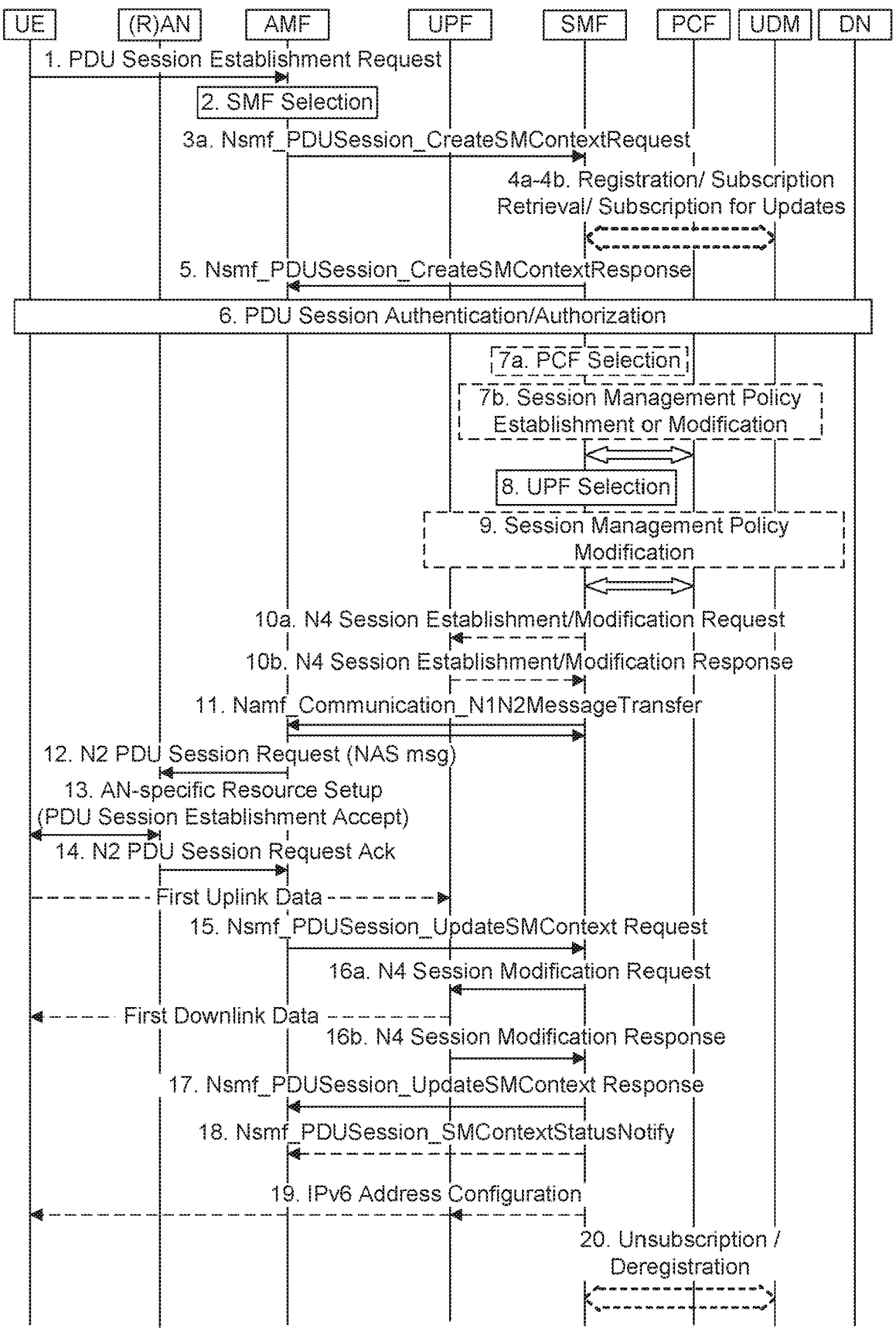
FIG. 11 is a call flow illustrating an example method for PDU session establishment.

5G PDU Session Establishment is described next. A PDU session is an association between a UE and a Data Network that may provide exchange of PDUs between the UE and the Data Network. Within the core network, a PDU session may consist of GTP tunnels that may be part of the PDU session and that may exist between the Access Network (AN) node and the UPFs depicted in FIG. 10. User plane traffic to/from a UE flow inside these tunnels may be set-up during the PDU Session Establishment procedure. A PDU session may be UE initiated. However, it may be triggered through a procedure known as Application Triggering, as is described in detail below. The 5G PDU session establishment procedure is defined in 3GPP TS 23.502 V15.1.0, section 4.3.2.2.1. FIG. 11 illustrates the 5G PDU session establishment procedure. In the 5G Core, this procedure may be used to establish a session between a UE and a UPF.

Specifically, and as shown in FIG. 11, in step 8 the SMF may select one or more UPFs as needed for the PDU session. This selection may be based on one or more of the following parameters: 1) a UPF's dynamic load; 2) a UPF location available at the SMF; 3) a UE location information; 4)

capability of the UPF and the functionality required for the particular UE session (an appropriate UPF can be selected by matching the functionality and features required for a UE); 5) a Data Network Name (DNN); 6) a PDU Session Type (i.e., IPv4, IPv6, IPv4v6, Ethernet Type, or Unstructured Type) and, if applicable, the static IP address/prefix; 7) an SSC mode selected for the PDU Session; and 8) a UE subscription profile in UDM.

Next, in step 10*a*, the SMF may send an N4 Session Establishment or Modification Request to the UPF to provision the PDU session information for this UPF. The SMF may provide Packet detection, enforcement and reporting rules to be installed on the UPF for this PDU Session. If a CN Tunnel Info is allocated by the SMF, the CN Tunnel Info may be provided to UPF in this step. If selective User Plane deactivation is required for this PDU Session, the SMF may determine the Inactivity Timer and may provide it to the UPF.

In step 12, the AMF may send an N2 PDU Session Request to the (R)AN that may contain: 1) an N2 SM information received from the SMF that provisions the (R)AN (allowing the tunnel between the (R)AN and the UPF); and 2) a NAS message, targeting the UE, containing PDU Session ID and PDU Session Establishment Accept.

Figure 12:
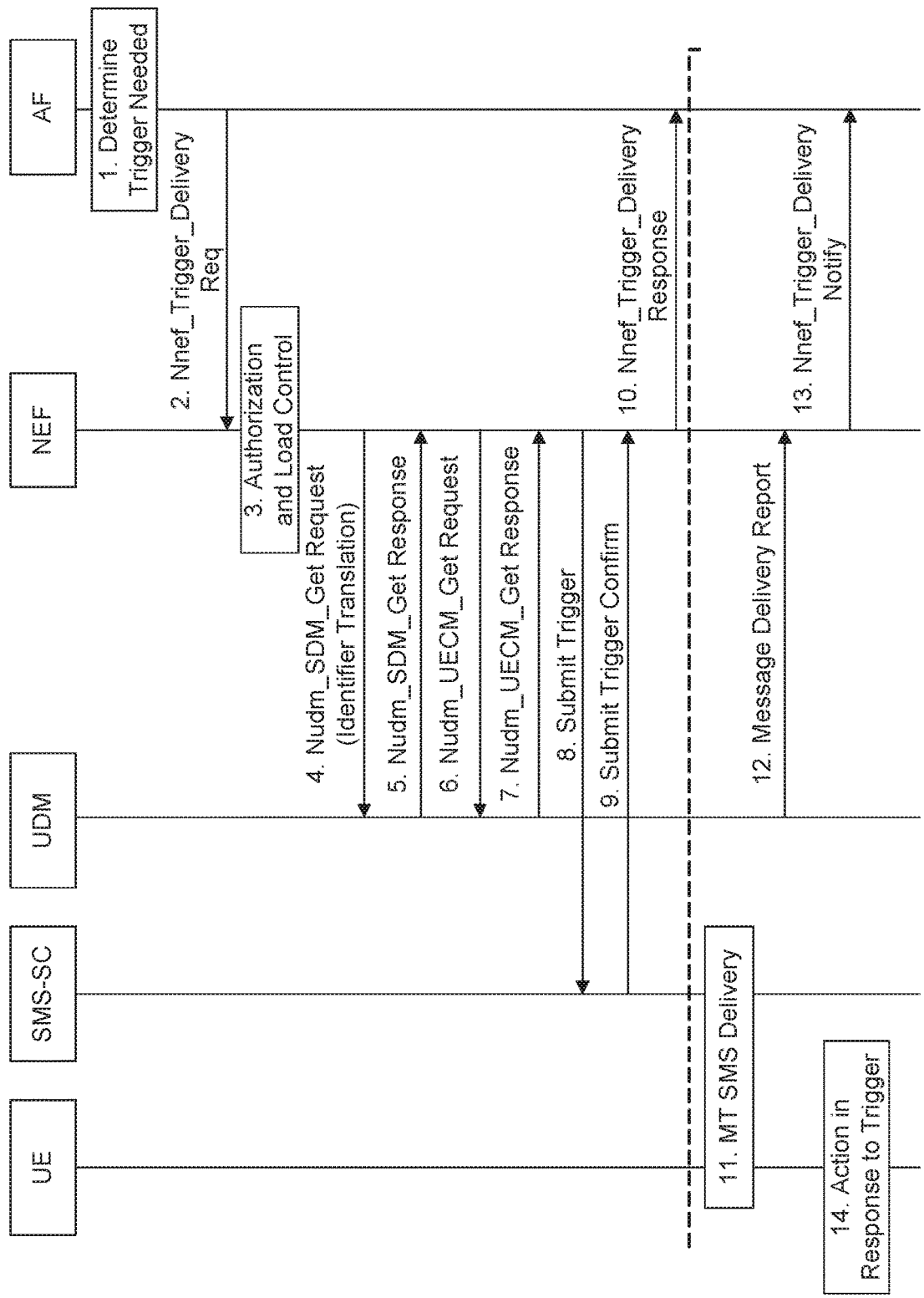
FIG. 12 is a call flow illustrating an example method for application triggering.

As mentioned above, a PDU session may be established by a UE. However, the network can trigger a UE to establish such a session. In this case, the network sends a device trigger message to one or more applications on the UE side. Thus, the payload included in a Device Trigger Request message may contain information such as which application on the UE side the trigger is targeted at. Based on that information, the one or more targeted applications on the UE side may then trigger the PDU Session Establishment procedure. The Application Triggering service may be invoked by an Application Function using an Nnef_Trigger service to request that the network sends an application trigger to the UE. FIG. 12 illustrates the application triggering procedure of 3GPP TS 23.502 V15.1.0, section 4.13.2. In step 2 therein, the AF may provide an indication of what application on the UE side should handle the trigger. It also may provide an external identity of the UE. In step 4, the core network may translate the provided external identity (GPSI) into an internal identity (SUPI/IMSI). Next, in step 6, the core network may retrieve other context information related to the UE to assist in the triggering, for example, the SMS Function to be used for this UE. Then, in step 8, the core network may send an SMS message to the UE, including the MS Application port ID (port of application to be triggered) and a trigger payload.

M2M/IoT devices are becoming more intelligent and independent. It is expected that eventually these devices will need to autonomously communicate with each other, be "social", even in cases where no prior relationship exists between the devices. This is similar to the way humans are often required to interact and socialize with strangers. Hence, predictably, M2M/IoT devices will become more and more "social" in the future.

Figure 13:
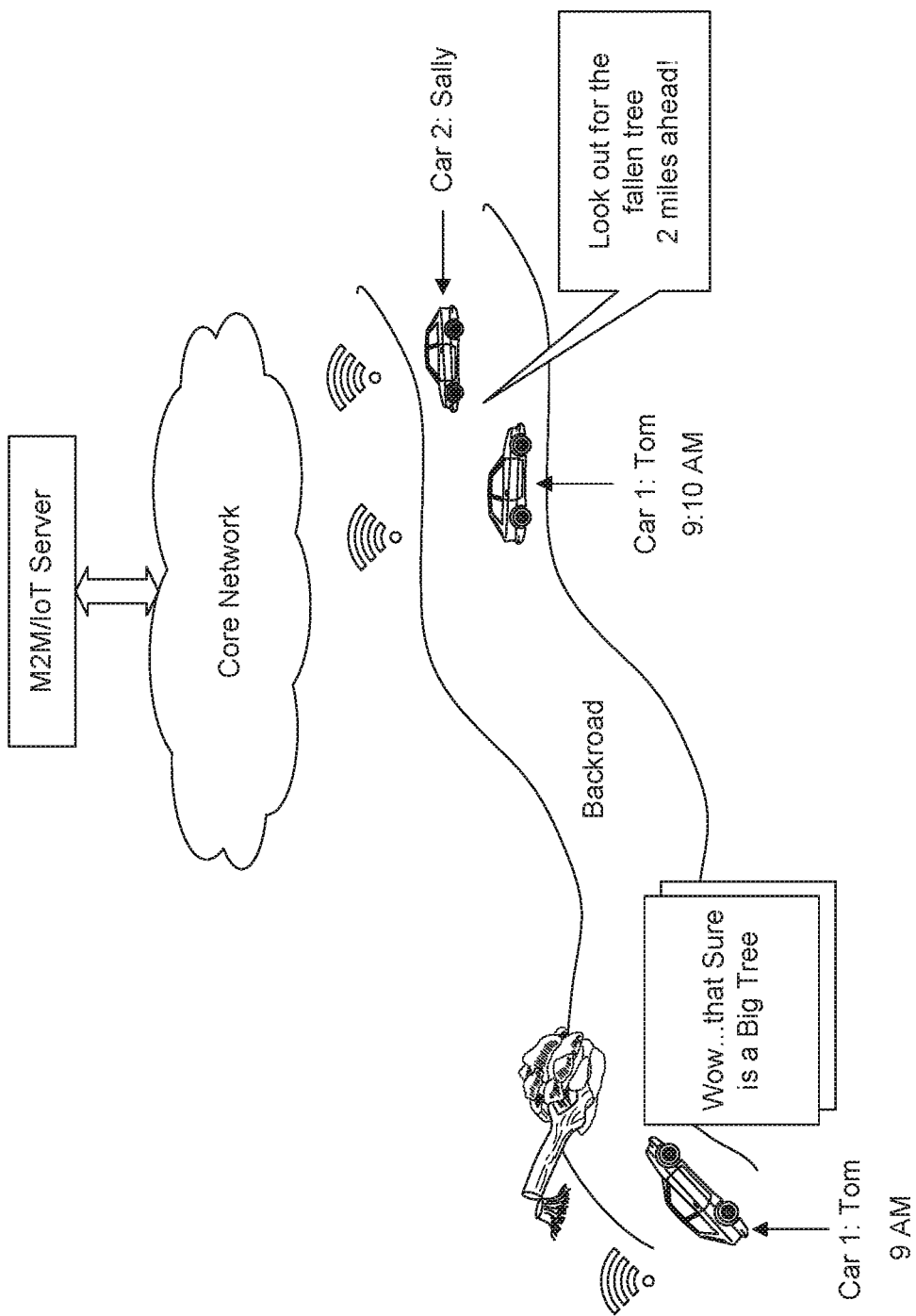
FIG. 13 is a diagram of an example use case involving a self-driving car with social application.

By way of example, and in reference to FIG. 13, a use-case, pertaining to self-driving cars equipped with devices with social applications, is considered. According to this use-case, due to a number of street closures caused by a water main break the traffic congestion is more than typical. On the way to work, Tom is sitting comfortably in his self-driving car. The car has cellular connectivity and its device hosts a number of applications, however the device does not support any D2D-like communication. For instance, there is an application for controlling the vehicle (App1), an application for monitoring the indoor comfort conditions (App2), and a social application for providing non-critical assistance to nearby vehicles (App3). Particularly, App3 enables communications between vehicles, for instance to permit the passengers to talk to each other. This particular morning, Tom is running late, and to try to make up some time, he programs his car's navigation system to take a country backroad to avoid the traffic. As the road is a backroad, it is not equipped with cameras and sensors, and there is no roadside assistance infrastructure (for example RSUs). As a result, the road has not been integrated into the city's road monitoring system. As shown in FIG. 13, at 9 AM, Tom's car (Car1) notices a huge tree trunk that is blocking the road for oncoming traffic. Tom's car, sends a warning message to the core network about the road hazard on segment-XYZ of route-123. This allows the core network to forward the warning message to all cars in the vicinity of the fallen tree. A few minutes later, Tom's car spots an incoming car (Car2). As a precaution, App3 in Tom's car would like to send the same warning message directly to Car2. Tom does not know the driver of Car2 (Sally). Luckily Tom's car has snapped a picture of the license plate as Car2 drove by. Tom's car sends a request to the cellular network to ask how to contact Car2. It provides the license plate in the request. The cellular network asks the M2M/IoT server for assistance, and the M2M/IoT server returns the IP address of Car2. Equipped with the IP address, App3 in Tom's car sends a message to Car2. Receiving the information in Tom's message, Car2 then can take some preventative actions, such as slowing down, moving onto the shoulder and/or changing route.

A problem highlighted in the self-driving car use-case described above is that generally App3 in Tom's car (Car1) does not know how to reach Sally's car (Car2). Three potential solutions are described below, but each has its shortcomings.

In a first potential solution, App3 may look at its own contact list and find that it has already communicated with Sally's car. For example, they may have exchanged SMS messages or they may have had a video chat through their car's communication system. In such a case, App3 may then already know either the IP address or the MSISDN of Car2, allowing it to send to Car2 either an IP packet or an SMS message, respectively. Unfortunately, this solution is not available in this use-case as Tom and Sally have never communicated before. The communication envisioned here is analogous to two strangers apologizing for bumping into each other. There is no intention for the two strangers to become friends or to communicate with each other in the future, therefore there is no exchange of contact information. It is a short-lived social interaction/communication.

In a second potential solution, Tom and Sally may have subscribed to an automotive traffic service. Tom's car could ask the traffic service for a permission to talk to Sally's car. The traffic service could then relay the traffic between Tom and Sally's cars, or it may provide the necessary information to Sam's car so that it may communicate with Sally's car directly, bypassing the traffic service. Although the latter solution would work for the presented use-case, it is not generally applicable, and it suffers from the silo-effect. Namely, devices that are normally in the same silo will be able to use this solution, but communication between devices that are normally in different silos will not be possible. For example, assume that Tom's car has to communicate with a curb-side garbage bin that has strayed onto a street. Such devices (a car and a garbage bin) typically do not talk to the same service. This would be analogous to two users using different social media platforms.

In a third potential solution, Tom's car could rely on 3GPP Proximity Services to discover, establish an IP connection to, and communicate with Sally's car. Although feasible, this solution suffers from the following drawbacks. First, the cars are travelling in opposite directions. Therefore, their devices may only be in range of each other for a very short period of time, hence, making direct discovery, possibly followed by direct communication, very difficult, as a typical range of LTE ProSe is on the order of 350 meter in line-of sight conditions. Second, there may be a large number of cars in the vicinity of Car1. Each of these cars may be announcing their availability. Car1 would need to look through all these announcements to discover the announcement from Car2. Third, as Tom and Sally are not friends, their applications would not know to monitor one another. As a result, Car2 would necessarily have to have an open monitoring, basically listening to all potential communication requests from nearby cars. This may be a heavy burden on Car2, and may leave it vulnerable to denial-of-service attacks.

Note that even if Tom's car (Car1) somehow knew how to reach Sally's car (Car2), Tom's car would still lack some "sociability information" that would make the communication session more efficient. For example, Tom's car may not know how to communicate with Car2 (e.g., WiFi or cellular communication link), when to communicate with Car2 (e.g., Car2 may prefer communication to be between 8 AM and 9 AM), which application should be targeted to handle the incoming communication request (e.g., port 443 or another port). This "sociability information" provides a sociability context and may describe under what terms an application, and by extension the device hosting that application, agrees to be social.

In summary, as M2M/IoT Devices become more and more autonomous, they will benefit from the capability of communicating with each other in cases where there are no prior relationships between these devices, a capability and methods this disclosure refers to as a "social discovery" and a "social communication." Cellular networks are ideal in maintaining context about UEs, but they are designed with an underlying assumption that a source device knows the identity of the device it wants to reach, for example, by using the target device's MSISDN or IP address or by relying on a 3rd party server. Currently, a social communication between M2M/IoT devices that are "strangers" is not possible.

Disclosed herein are methods and apparatus to enable M2M/IoT devices that are strangers to discover each other's identity and to establish social communications between them. In one aspect, a new network functionality (network function) is disclosed that may store sociability context for M2M/IoT devices that want to socialize, assist in the discovery of those M2M/IoT devices, and verify that two devices may be social. To that end, a new social registration method is disclosed that allows an M2M/IoT device to register its sociability with the core network—its social identifiers as well as its social policy. Also disclosed is a new social discovery method in which a source device may provide the core network with a set of observed physical and wireless markers of a target device, and where the core network may use these markers to find the identity of the target device. This method may be hierarchical within the core network, where the core network may reach out to other core networks and to M2M/IoT servers for assistance. A new social communication method is also disclosed in which a source device may request the core network to start a social communication session with a target device. To that end, the source device may provide its social preferences, and in turn, the core network may determine whether the source device and target device can socialize by comparing these preferences with the target device's social permissions. Thus, the social preferences and the social permissions may be part of the social policies of the source and target devices, respectively, and, when compared, they may provide the conditions under which a social communication is available (e.g., over which access network, at what time, at what location, or over what protocols). In addition, a method is disclosed in which the core network may use control plane signaling to allow devices to support incoming network connections. A graphical user interface may also be provided at the M2M/IoT device.

Architecture to Support Social Discovery and Social Communication

Figure 14:
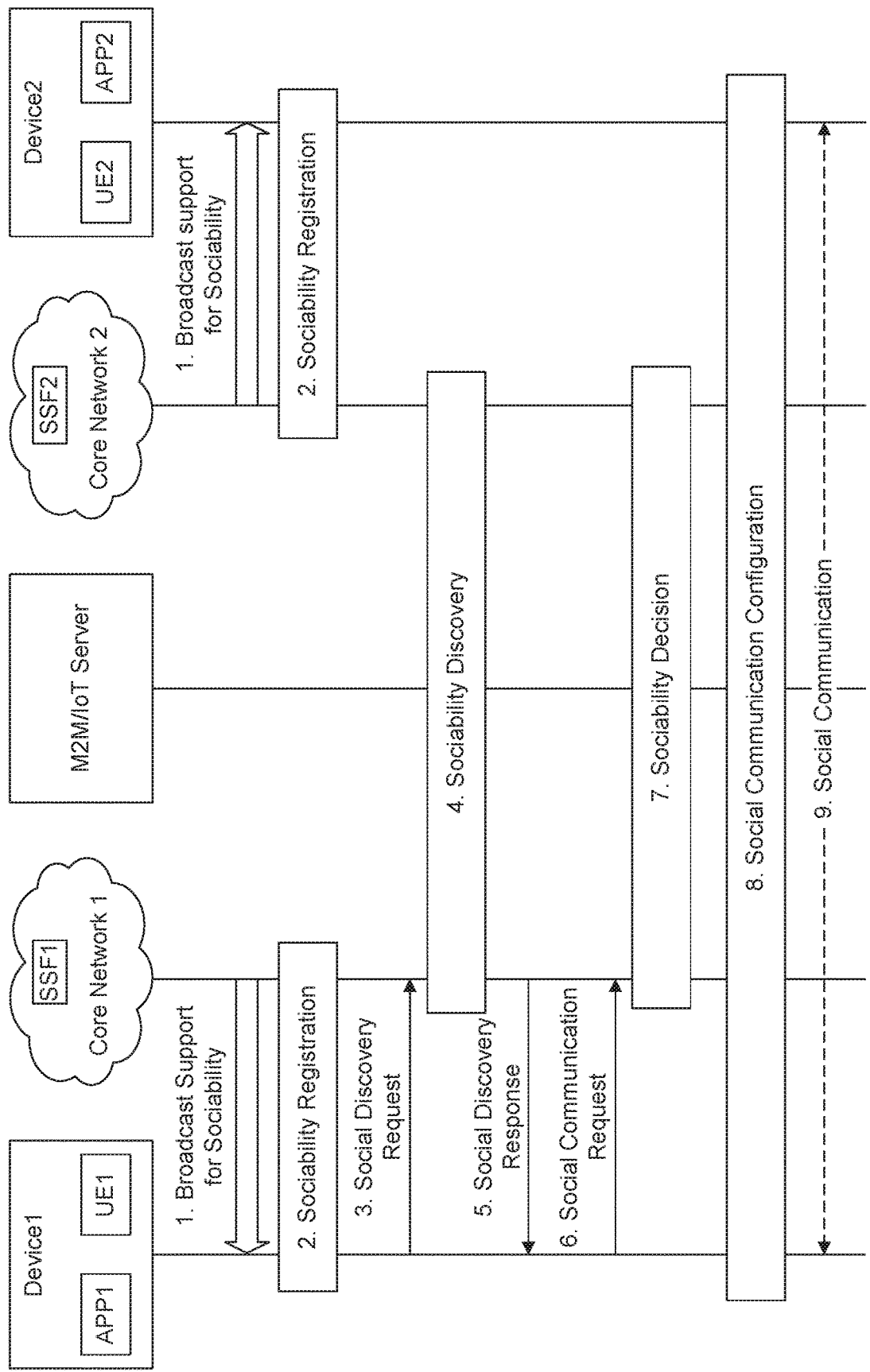
FIG. 14 is a call flow illustrating an example method of social discovery and social communication.

FIG. 14 illustrates an architecture and associated methods to enable socialization among devices. As mentioned, social communication refers to the exchange of packets/information between two devices that may be strangers to each other—it may occur when applications on these two devices, which did not previously interact with each other, communicate. Typically, a social communication session starts after a social discovery is established. The exchange of packets/information may be configured, for example, over a 3GPP network, over a 3GPP direct link, over WiFi link, or via an M2M/IoT server. FIG. 14 shows a method in which two devices, Device1 and Device2, start a social communication session. Typically, these devices do not know the identity of each other as they have not communicated before. In the example shown, both Device1 and Device2 may host application APP1 and APP2, respectively, as well as a 3GPP UE, UE1 and UE2, respectively.

In step 1 of FIG. 14, core networks that support sociability and host an SSF may broadcast an indication that SSF is supported. For example, such indication may be included in the cell's system information. SSF support may be provided for social discovery, social communication, or both. This broadcasted sociability information may further indicate certain capabilities of the SSF (e.g., the types of markers that are supported). Possibly, the sociability information may be broadcasted with other core network capabilities of the network in an existing System Information Block (SIB), such as in an existing SIB18 used to indicate core network support for ProSe or in a new SIB dedicated for sociability capability. The sociability information may be provided to the RAN by the MME/AMF. Note that the SSF's capability information may be not expected to change very often and may have a low update periodicity. As an alternative (not shown in FIG. 14), a device may determine the network support for sociability through the UE attach (or UE registration) procedure. The relevant information may be included in the Attach Accept (or Registration Accept) message.

In step 2, applications APP1 and APP2 may register their sociability with the SSF in their respective core network. During registration, UE1 and UE2 as well as APP1 and APP2 may obtain the capability information of SSF1 and SSF2, respectively. SSF may be provided by any CN function. As an alternative (not shown in FIG. 14), SSF may be provided by M2M/IoT server or SCS/AS.

In step 3, Device1 may send a Social Discovery Request to SSF1, wherein Device1 may request SSF1 to find the identity of a Device2. Device2 may be known by one or more non-communication markers—social markers such as license plate, location, bar code reading, or physical description. Next, in step 4, SSF1 may determine the identity of Device2. If necessary, the core network may need to contact other SSFs (such as SSF2), and/or M2M/IoT servers to assist in making this decision. Then, in step 5, SSF1 may respond to Device1 with information on the identity of Device2 (e.g., IP Address, External ID, User Identity, or MSISDN). Optionally, a temporary identifier may be created by SSF1 (or by one of other SSFs and M2M/IoT servers) and may be provided to UE1. This temporary identifier may identify Device2 within the 5GS but hide Device2's identity from DEV 1.

A Social Communication Request may take place in step 6, where Device1 may issue a request to start socializing with Device2. For example, Device1 may want to send a video to an application of Device2. Hence, in step 7, SSF1 (or one of other SSFs and M2M/IoT servers) may evaluate whether Device1 and Device2 may socialize. SSF1, may then respond to Device1 with an indication of whether socialization with Device2 may be allowed, potentially including in the response information on the identity of Device2 (e.g., IP Address, External ID, User Identity, or MSISDN). As mentioned above, that identifier may be a temporary identifier that identifies Device2 within the 5GS but hides Device2's identity from Device1. Next, in step 8, SSF1 (or one of other SSFs and/or M2M/IoT servers) may configure the communications between the two devices. For example, it may configure the communication mechanism between the two devices to be WiFi direct, ProSe, SMS, or IP. At this point, in step 9, Device1 and Device2 may begin communicating over the configured mechanism.

Figure 15:
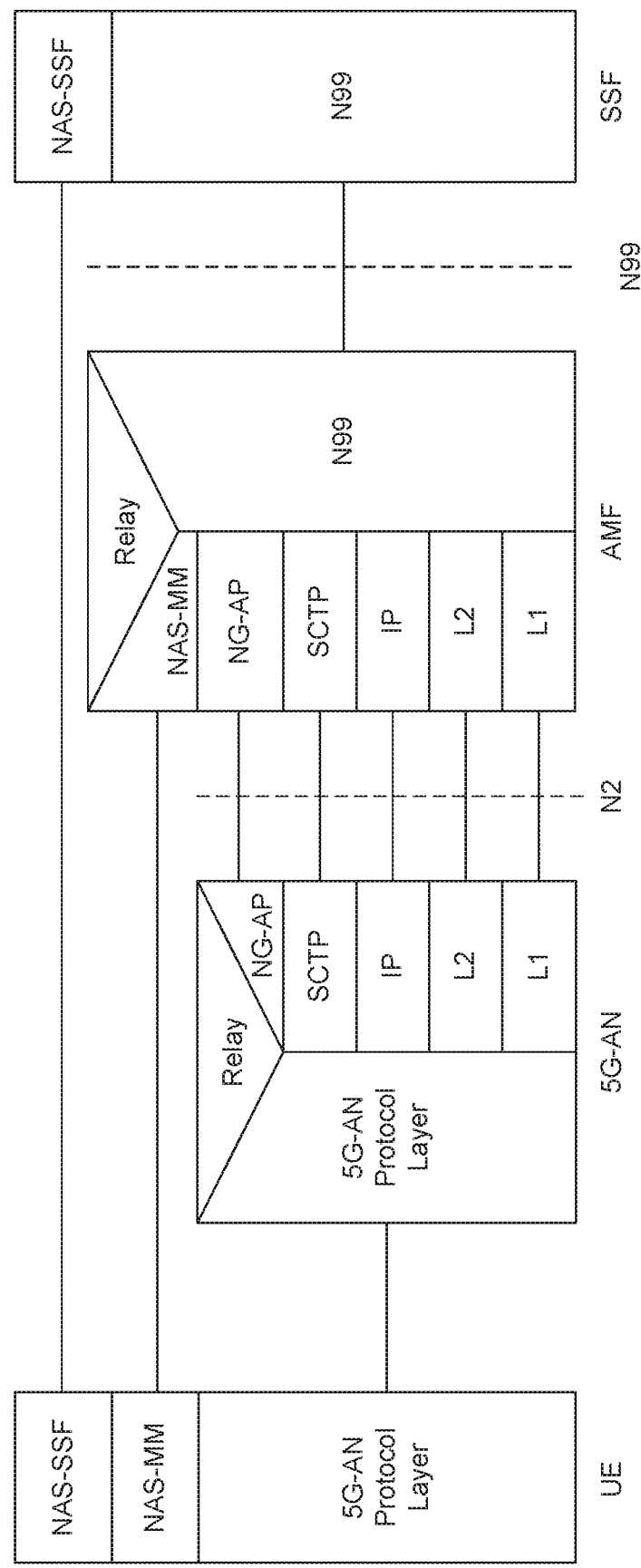
FIG. 15 illustrates an example Sociability Service Function (SSF) protocol stack in 5G system.

An SSF's protocol stack in a 5G system is shown in FIG. 15. FIG. 15 shows how SSF service may communicate with UEs in a 5G system. In this example protocol stack, communication between a UE and an SSF may be carried on top of NAS-MM signaling and may be carried out in a new NAS protocol called NAS-SSF. Note that an SSF functionality may be part of another NF, such as AMF. If it is part of AMF, then NAS-SSF functionality may be part of NAS-MM protocol. Note that N2 is the interface between a 5G-AN and AMF (as described in 3GPP TS 23.501 V15.1.0 for example), while N99 refers to a new interface between AMF and SSF.

Sociability Registration

Sociability Registration may provide applications with the means to register with an SSF how social they intend to be. Hence, Registration may occur before social discovery and/or social communication are employed. In addition to informing the core network how social an application on a device wants to be, the application may provide the network with its sociability context—social identifiers and social policy. Hence, when registering, the application may provide an SSF a sociability context, containing one or more social identifiers and one or more social permissions or social preferences (i.e., social policy). The SSF may then store the sociability context provided by the device.

Figure 16:
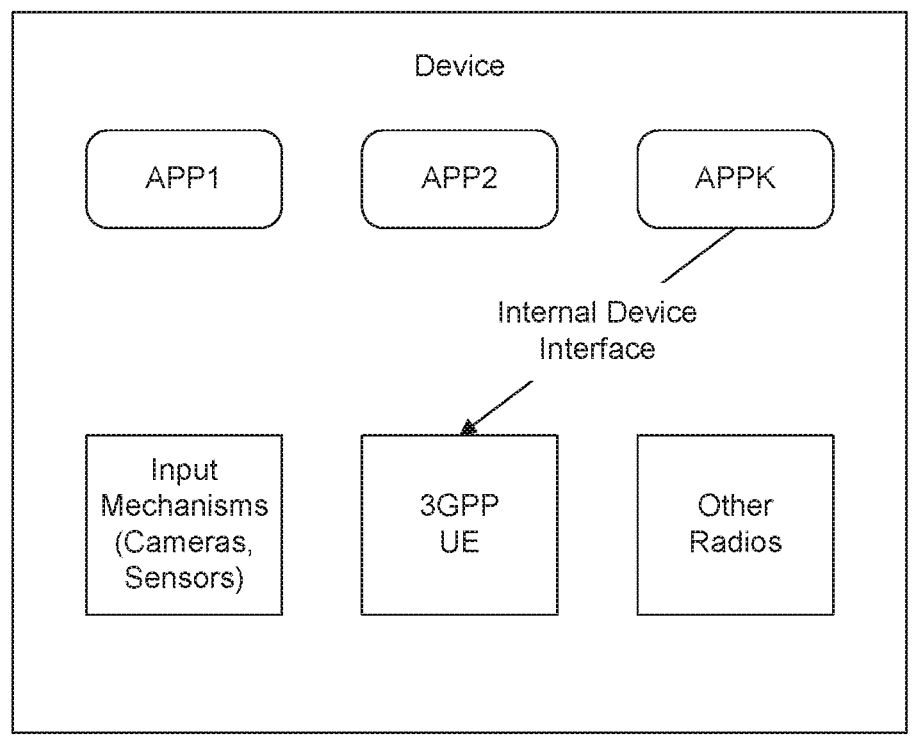
FIG. 16 is a block diagram of a device.

FIG. 16 illustrates a device having a number of input mechanisms (such as cameras and other sensors), a 3GPP UE, and, optionally, one or more other radios (communication links such as Bluetooth or WiFi). The UE on the device is usually registered with the cellular network and, in this example, has installed social application APPk, and, optionally, one or more other applications, such as APP1 and APP2.

Figure 17:
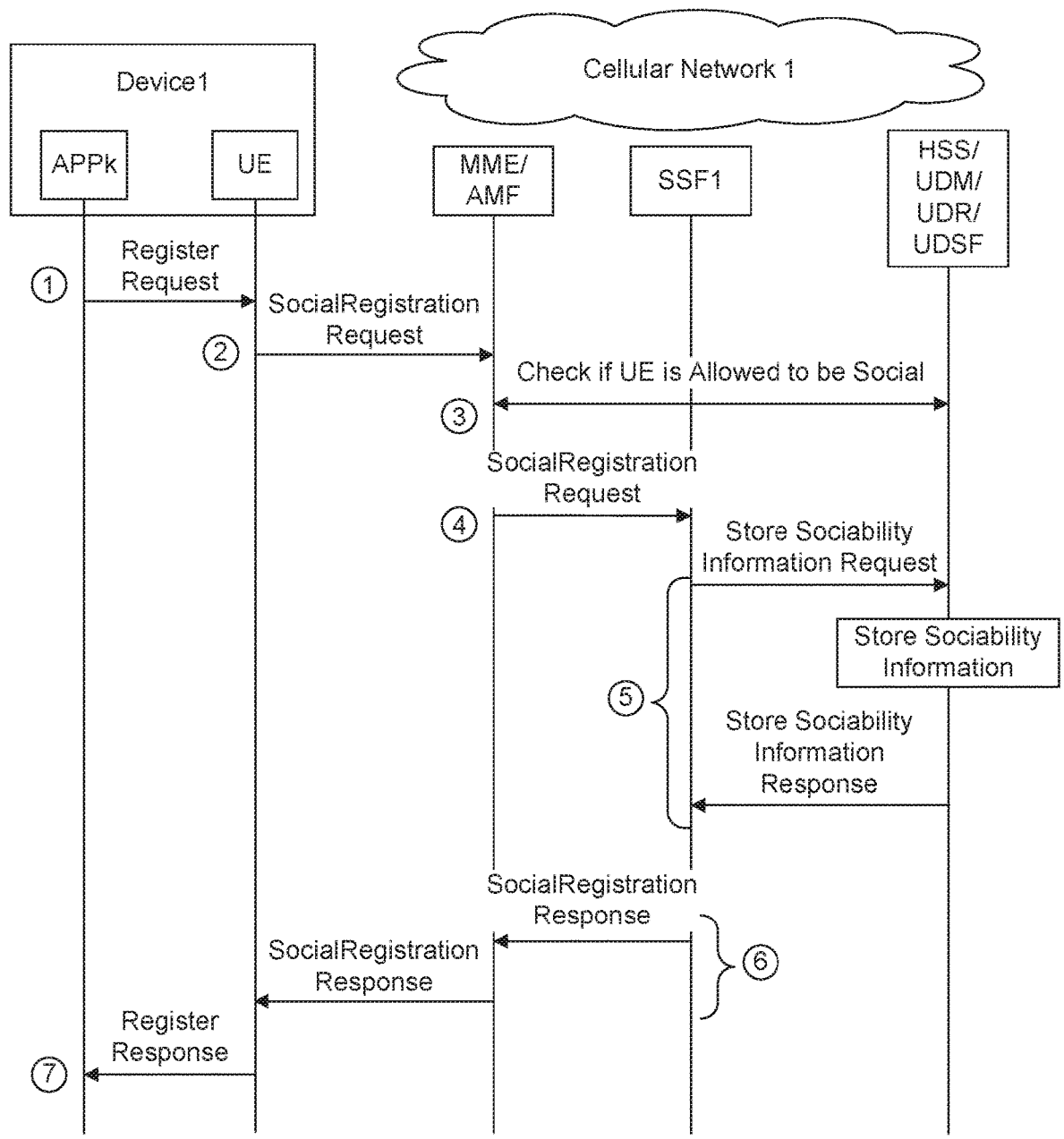
FIG. 17 is a call flow illustrating an example method for registering sociability information by an application.

FIG. 17 illustrates a social registration method. In step 1, APPk may use Device1's internal device interface to request that the UE register APPk's social context. APPk may provide one or more of the following information in the Register Request: Application ID, Social Identifiers, and Social Permissions. Application ID may be the identifier of the application instance, assignable by the device's operating system that uniquely identifies the application instance. Alternatively, if the device is restricted to only having a single application of each type, Application ID may be the ID that uniquely identifies, for example, the Android application type in the Google Play Store.

Social Identifiers, included in the Register Request of FIG. 17, may be identifiers that characterize the object associated with Device1 of APPk. These identifiers may provide the cellular network with the means that later may be used in identifying ("discovering") Device1. These identifiers may include a set of physical attributes. For example, if Device1 is associated with a car, the social identifiers may include: license plate number, VIN, make, model, year, color, or any other physically visible attribute (e.g., convertible or right fender damaged). Where Device1 is associated with a robot, the social identifiers may include robot ID or robot type. As yet another example, if Device1 is associated with a bus, the social identifiers may include the bus number, type, or route. These identifiers may be unique or global, and as such uniquely identify Device1, e.g., a car's VIN. Alternatively, these identifiers may be non-unique, e.g., a car's make and model. Consequently, non-unique identifiers can help in identifying a device, but are not by themselves enough to uniquely identify it.

Social Permissions, included in the Register Request of FIG. 17, refer to policies related to how social application APPk may want to be, or under what conditions APPk may be willing to communicate with other devices' applications. Such a social policy may include:

Whitelists (or Blacklists), indicating who is allowed (or not allowed) to communicate with the device or its application, by, for example, providing types or identifiers of those devices or their applications.

Time Limits, indicating when the device is willing to be social. For example, within a certain window of time or when it is not roaming.

Location, indicating the area within which the device is willing to be social. Such an area may be near the device's "home" or within a certain city, cell, or tracking area.

Communication, indicating the manner in which the device is willing to be contacted. For example, over WiFi direct, 3GPP Direct Communication (e.g., ProSe), IP, an intra-CN communication, or an M2M/IoT server.

M2M/IoT server, indicating the address (URI) of the M2M/IoT server that may be used.

The status of the device, including, for example, the motion patterns of the device. A device may be in a driving mode if it is moving faster than 20 miles/hour or it may be in a jogging mode as may be indicated by a Gyro and/or an Accelerometer.

An indication whether the application is the default social application for the device.

Upon receiving the RegisterRequest from APPk, in step 2, the UE may send a SocialRegistration Request to the MME/AMF. This request may include:

A Request Type, denoting the purpose of the request, which for example, may include:

"CREATE," indicating an initial registration;

"UPDATE," to modify or remove a social identifier, a social permission, or to request a new Temporary Social Communication Identifier; or "DELETE," may be used by the UE when the application on the hosting device is deleted.

Application ID received from APPk.
Unique Social Identifiers received from APPk.
Non-Unique Social Identifiers received from APPk.
Social Permissions received from APPk.
Transaction ID, identifying the specific transaction from this UE (since a UE may have to register multiple applications, a UE may issue multiple SocialRegistration Requests, each with its own Transaction ID).
Port ID, denoting the port number associated with the application. A UE may also indicate whether the port is always open, or whether it needs to be directed to be open.

Note that a UE may be aware of additional information that may be added to the social identifiers provided by the application. These identifiers may be common to all applications hosted on the device. Such identifiers may include the location of the device (e.g., cell identity, tracking area, or civic address), allowing a device, for example, to be identified as the device at address 123 Main Street. Additionally, a UE may add more social permissions. For instance, a UE may add CoreNetworkAssistance information. This is an indication that allows the core network to identify the device based on information that the core network has stored about the device's UE. For example, the core network may use UE location information and/or UE route information to help identify a device. This may allow a device to be identified as being, for example, the device that is currently at the corner of Elm and Maple street, the device that is currently travelling at 25 mph down Highway 25, or the device that was at the train station at 2 AM this morning.

In response to the UE's SocialRegistration Request, in step 3, the MME/AMF may check the UE subscription to determine whether UE may be allowed to be social. Note that even though a UE may support the use of sociability service, the UE may not be subscribed for such sociability service. For example, the owner of a UE may not have purchased this type of subscription. Thus, this step allows a core network to refuse SocialRegistration requests from that UE. Next, in step 4, the MME/AMF may forward the SocialRegistration Request to the Sociability Server Function, SSF1. Then, in step 5, SSF1 may store the sociability information in the SocialRegistration Request, for example, in the HSS, UDM, UDR, and/or UDSF. As mentioned above, a device may host multiple applications; therefore, it may have sociability information for each of these applications.

Table 1 lists the sociability information that may be stored in the HSS, UDM, UDR, and/or UDSF.

TABLE 1

| Social Information stored in HSS/UDM/UDR/UDSF | |
|---|---|
| Field | Description |
| Information with respect to a UE: | |
| UE Identity | The identifier of a UE in the cellular network, e.g., IMSI, SUPI, and/or MSISDN. |
| Node/Device identifier | The identifier of a device hosting a UE, e.g., IMEI, UUID, and/or GUID. |
| Sociability | Indication whether a UE may be social - whether a UE may, on behalf of applications hosted in its hosting device: register to sociability services; issue Social Discovery Requests; or issue Social Communication Requests. |
| Temporary Social Communication Identifier | A UE temporary identifier in the cellular network which corresponds in the CN to the UE Identity. This temporary identifier will be sent by the CN to other UEs that initiate social communications with the UE, instead of sending its UE Identity. Whether a UE Identity or a Temporary Social Communication Identifier is used may depend on the UE subscription, Social Permissions, CN configuration, and other policies. A temporary identifier may be changed regularly by the CN based on local policies, or upon a request from the corresponding UE. |
| Information with respect to each social application: | |
| Application ID | Application identifier, may be the Android App ID |
| Unique/Global Social Identifiers | List of attributes that uniquely identify a device, including physical and wireless attributes: Physical attributes are observable/measurable attributes (e.g., VIN). Wireless attributes may be derived by the application or the cellular network. For example, the cellular network, upon receiving from a source device a discovery request based on a measured operating frequency of a target device, may derive the target device identity based on its knowledge that this is the only device operating on that measured operating frequency. |

TABLE 1-continued

Social Information stored in HSS/UDM/UDR/UDSF

| Field | Description |
|---|---|
| Non-Unique Social Identifiers | List of attributes that help with identifying a device, but are not on their own sufficient to uniquely identify a device, including physical and wireless attributes: Physical attributes are observable/measurable attributes that non-uniquely identify the device (e.g., a car make or a model). Wireless attributes may be derived by the application or the cellular network. For example, the cellular network, upon receiving from a source device a discovery request based on a measured operating frequency of a target device, may constrain its search for the target device identity based on its knowledge of devices that operate within a frequency band that includes that measured operating frequency. |
| Social Permissions | List of permissions specifying when a device's application is willing to be social. This includes policies related to when, how, with whom, where, or how often within a time window the device's application would be willing to communicate with another device's application. |
| Port Number | A device's port number that is associated with a certain application. |
| Default Indicator | Indicator specifying whether the application that initiated the registration request is the default social application on the device. |
| Social Application Type | A description of the purpose of each application. Used by the CN to decide which port number to route incoming social communications to. For example, it may indicate "message display" or "auto control". |

Once the sociability information has been stored, in step 6, the SSF1 may respond to the UE's registration request with a SocialRegistration Response, forwarding it through the MME/AMF. The response may include the status of the request (reject or accept), as well as the Transaction ID received in step 2. Then, in step 7, the UE may use the internal device interface to indicate to application APPk a successful or a failed social registration attempt. The UE may provide one or more of the following information in the Register Response message: Application ID, Request Status (success or failure), and Temporary Social Communication Identifier, if applicable.

Note that in the above method, the SocialRegistration Request is shown as a new control plane message that is sent by the device to the core network. As an alternative, the content of this message may be carried as new IEs or in a container in the existing Attach Request, Attach Complete, Registration Request, or Registration Complete messages. Additionally, note that APPk and/or UE may update or delete the sociability registration at any time. APPk may use the internal device interface to request the UE to update or delete the social context stored in the cellular network—in which case the UE may issue a SocialRegistration Request, with a Request Type set to "UPDATE" or "DELETE". Hence, APPk may issue an update request, for instance, to add, modify, or remove a social identity or a social permission, as well as to request a new Temporary Social Communication Identifier. Note, also, that UE may issue a delete request if APPk has been deleted from Device1.

Social Discovery

Figure 18:
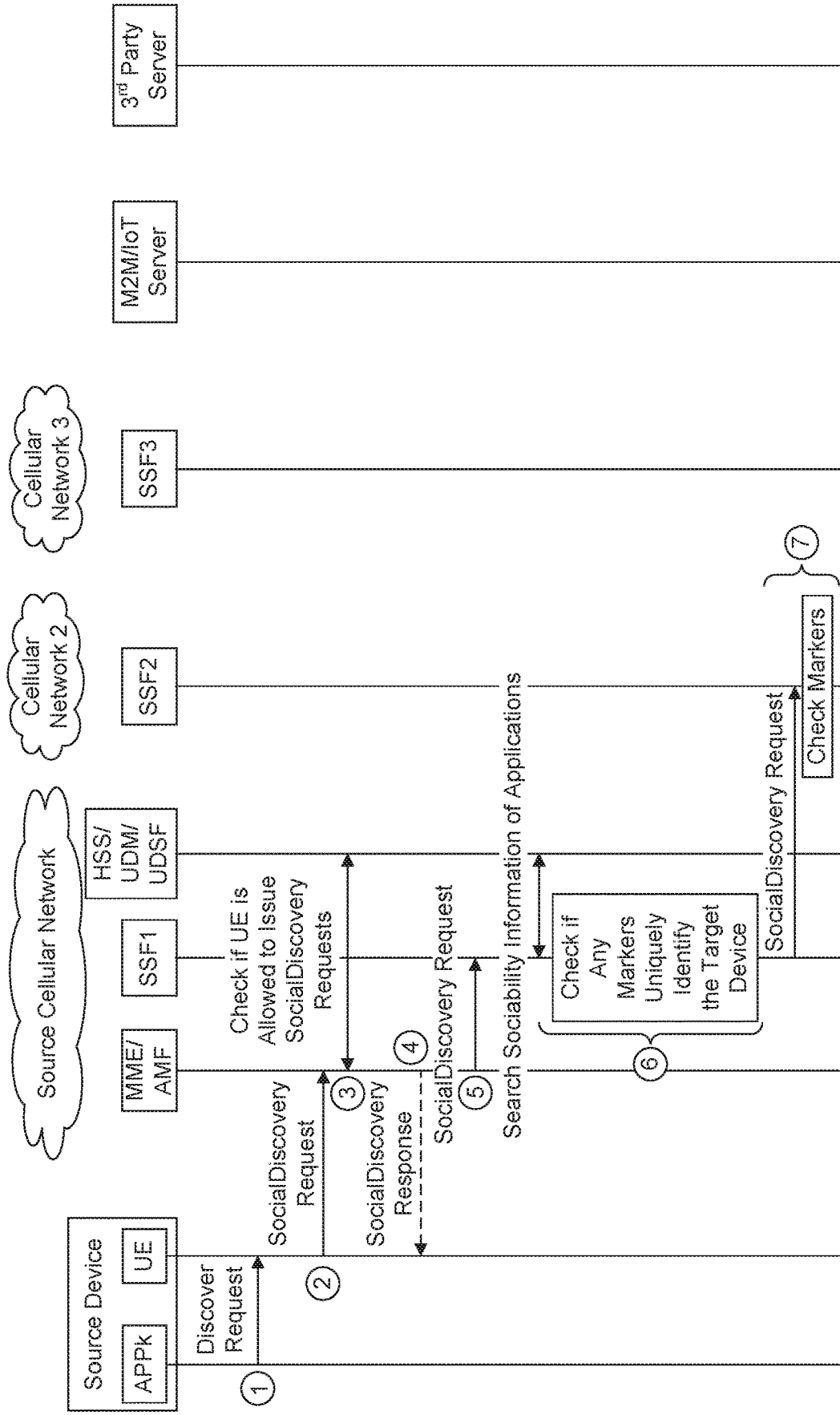
FIG. 18 is a call flow illustrating an example method for social discovery.
Figure 18:
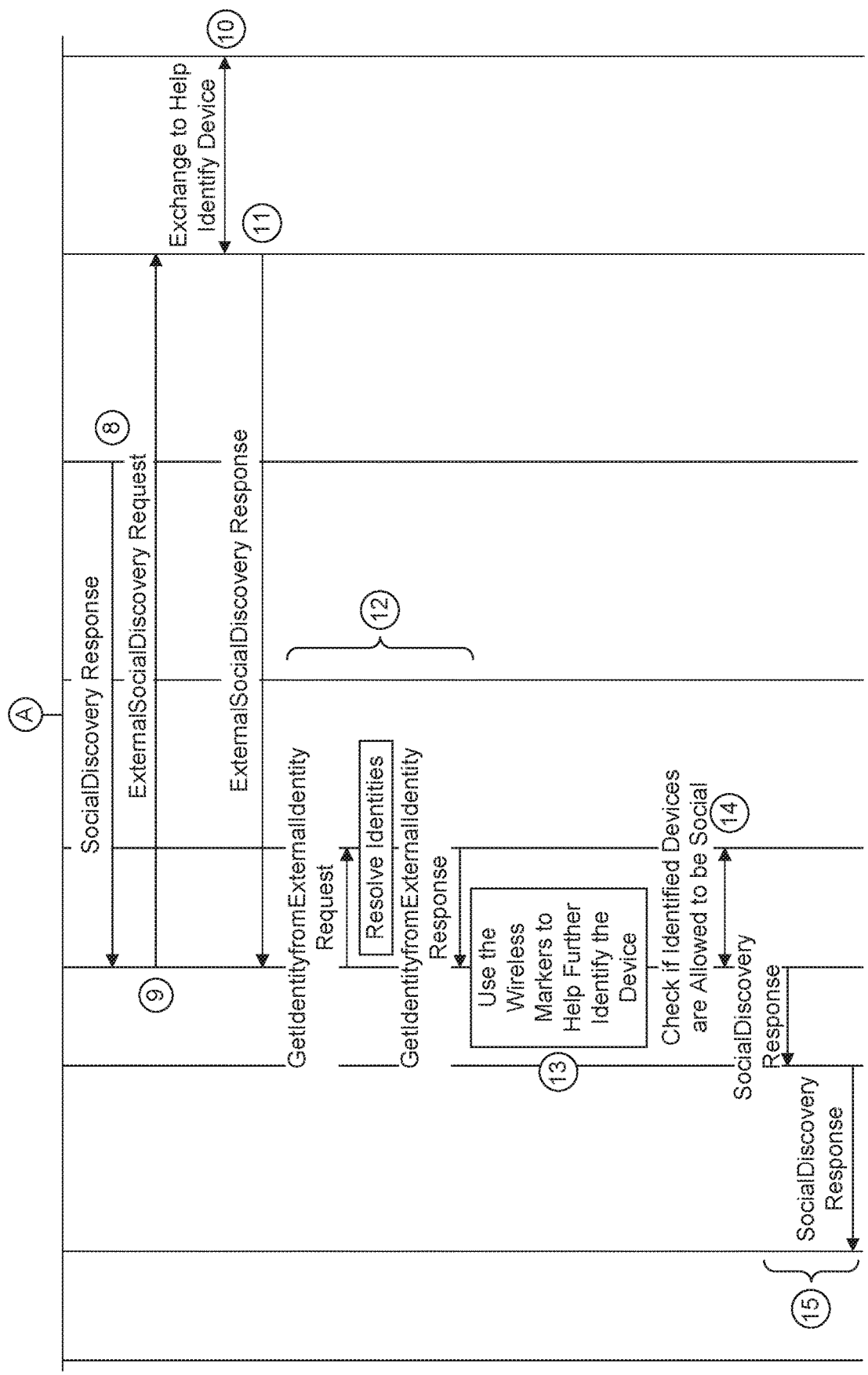

A Social Discovery method may be used by a source device to discover the identity of a target device or a set of target devices—the process of discovering the address with which a target device may be reached by a source device. Alternatively, this method may be used to merely find if a discovered target device is social. If the cellular network is not able to uniquely identify the target devices, the cellular network may provide addresses with an indication that those are only potential addresses. FIG. 18 illustrates one example of a Social Discovery method.

A source device may have numerous input mechanisms and, therefore, may be capable of observing or measuring various physical markers or wireless markers that are characteristic of the object associated with the target device of interest. Such input mechanisms may include cameras, scanners, and/or other sensors capable of recording data that may be used to generate the various markers. Examples of physical markers may include attributes of the object associated with the device, such as the type of that object (e.g., a truck, a car, a robot, a smart lamppost, or a bus) or, for a vehicle, its license plate number, VIN, color. Examples of wireless markers may include attributes of the object associated with the device, such as location (address, cell identity, tracking area), activity (on/off), motion (route, speed), the device's transmission frequency, or IDs that may be broadcast by the device.

Before a Social Discovery method may be initiated, regularly, the source and target devices may be already registered and approved for sociability services according to the registration method described above in reference to FIG. 17. The discovery method may start in step 1 of FIG. 18, where APPk may use the internal interface of its hosting Source Device to request the UE to discover how to reach a target device of interest. APPk may provide one or more of the following information elements in a Discover Request:

Application ID, identifying the application;

Social Markers, attributes of the target device of interest, as may have been observed or measured by the source device, including physical or wireless markers as well as unique (global) or non-unique markers;

Time Window, indicating the time segment APPk is willing to wait for a response before the request may be ignored or deleted; and CheckSociability, an optional flag, asking that the CN verify that the target device indeed wants to be social.

In response to the APPk's request for discovery, in step 2, the UE may issue a SocialDiscovery Request to the MME/AMF. The SocialDiscovery Request may contain the Application ID, Social Markers, Time Window, and optionally CheckSociability flag received from APPk in step 1, as well as a Transaction ID. As an example, the SocialDiscovery Request may include a request to discover a target device with attributes such as: 1) a target device's type (e.g., Truck and UPS); 2) a location (Lower Manhattan, corner of Elm, and Maple street); and 3) a time window (between 5 pm and 5:30 pm). The request might include also the Temporary Social Communication Identifier of the source device, if one has been provided.

Next, in step 3, MME/AMF may verify if Source Device and APPk have permission to issue SocialDiscovery Requests. It may verify the subscription information of that device as stored in the HSS/UDM. If not permitted by the subscription, MME/AMF, in step 4, may return a SocialDiscovery Response to Source Device with a cause value of "Social Discovery not allowed" and all further processing stops. Otherwise, in step 5, MME/AMF may forward the SocialDiscovery Request to the cellular network's Sociability Server Function, SSF1.

Upon receiving the SocialDiscovery Request, SSF1 may check, in step 6, whether any of the markers received by Source Device uniquely identify a registered device that matches the target device. SSF1 may need to interact with HSS, UDM, or UDSF to search through all the applications that have registered their sociability with the Source Cellular Network. For example, one of the markers might be a VIN. In that case, SSF1 would check whether any of the social registrations has a matching VIN, and, if so, would save the identity of that matching device and would proceed to step 13 described below. That identity may be the SUPI, SUCI, IMSI, 5G-TMSI/TMSI, 5G-GUTI/GUTI, PEI/IMEI, GPSI/MSISDN, or any other external identifier. If the matching device has been provided with a Temporary Social Communication Identifier it may also be saved and mapped to the matching device's UE Identifiers.

However, if SSF1 is not able to uniquely identify a match to the target device, in step 7, SSF1 may check with other cellular networks to see whether they can uniquely identify a matching device. This is assuming that the target device is receiving cellular service from one of those other cellular networks. Hence, for example, SSF1 may contact SSFs in Core Network 2, SSF2, and in Core Network 3, SSF3. Although not shown in FIG. 18, SSF1 may query SSF2 and SSF3 to ask if they provide service at that location. SSF1, SSF2, and SSF3 may communicate with each other via the Security Edge Protection Proxy (SEPP).

Thus, if any of these SSFs identify a match to the target device, in step 8, they may return the identity of that matching device to SSF1, and the flow may then proceed to step 13. That identity may be one or more of the following: SUPI/SUCI/IMSI, 5G-TMSI/TMSI, 5G-GUTI/GUTI, PEI/IMEI, GPSI/MSISDN, IP address, or any other external identifiers. Alternatively, it may be a new temporary identifier that was created for the matching device for social interaction. Otherwise, if no SSF is able to identify a match to the target device, in step 9, SSF1 may check with an M2M/IoT server, or other third-party AS, for help with the identification. SSF1 may determine what third-party AS to query based on the type and value of the markers provided by the source device. Accordingly, SSF1 may use the SCEF or NEF (not shown in FIG. 18) to send an ExternalSocialDiscovery Request to the M2M/IoT server. This request may include a filtered list of the Social Markers provided in steps 1 and 2. For example, SSF1 may remove all wireless markers. For example, the ExternalSocialDiscovery Request may permit discovery based on the markers: truck, UPS, and Lower Manhattan, filtering out the markers: corner of Elm and Maple streets.

Upon receiving the ExternalSocialDiscovery Request, in step 10, the M2M/IoT server may search its database for a match to the target device. It may also ask other M2M/IoT servers and/or 3rd part servers for assistance. For example, the M2M/IoT server may communicate with a UPS fleet management server for assistance. The result of this search may be the identity of a unique matching device or a list of identities of potentially matching devices. Note that the identity available to the M2M/IoT server may be an external identifier, such as the GPSI, MSISDN, IP address, or other external identifier, but not the SUPI or IMSI. Next in step 11, the M2M/IoT server may respond to SSF1 with an ExternalSocialDiscovery Response that may include a list of one or more external identifiers, namely the "candidate identified devices" list. This message may be conveyed through a SCEF or NEF network function. In step 12, SSF1 may use a GetIdentityfromExternalIdentity Request to interact with the HSS, UDM, UDR, or UDSF to determine the SUPIs/IMSIs corresponding to the provided external identifiers. The HSS, UDM, UDR, or UDSF may resolve each external identifier into SUPI/IMSI, 5G-TMSI/TMSI, 5G-GUTI/GUTI, or PEI/IMEI and then may issue a GetIdentityfromExternalIdentity Response back to SSF1, with the found identities. Although not shown in the call flow, if necessary SSF1 may need to interact with all the other cellular networks to complete this operation, as some of the external identifiers may be assigned by these other cellular networks.

Having all external identities resolved, in step 13, SSF1 may cross-reference the wireless markers, obtained via the discovery request in step 1, with the devices included in the list of candidate identified devices. Thus, SSF1 may check whether the social identifiers of the devices in that list match Source Device observed social markers. For example, if the source device observes the target device's operating frequency, wireless marker F3, then, first, if the M2M/IoT server returns a single device identity, SSF1 may check that it is using frequency F3. Second, wireless marker F3 may allow SSF1 to filter the list of candidate identified devices provided by the M2M/IoT server. Meaning, if a device in the candidate identified devices list does not have a matching operating frequency, then this device may be eliminated from that list.

The above filtering method may be described with respect to the following wireless markers, however, the filtering method may be generalized to other markers.

Location: SSF1 may verify that the current location of the target device matches the wireless marker. For example, if the M2M/IoT server returned a single target device identifier (MSISDN1), in step 11, and if then SSF1 determined that this single target device identifier corresponds to device with SUPI1 or IMSI1, in step 12, SSF1 may ask MME or AMF for the current location of the device with SUPI1 or IMSI1 and then check, for example, that it is near the corner of Elm and Maple streets.

Location History: SSF1 may verify that prior locations of the target device match the wireless marker. For example, the wireless marker may include an indication that the device was near 322 Oak Street at 1 pm. In such a case, SSF1 may ask the MME or AMF for the location of the device SUPI1 or IMSI1 at 1 μm and check that it is near 322 Oak Street.

Route: SSF1 may verify that the route of the target device matches the wireless marker. For example, the wireless marker may include an indication that the device was travelling north on Highway 25 and then east on route 23 at 1 pm. SSF1 may ask the MME or AMF for the route of the device SUPI1 or IMSI1 at 1 μm and check that it matches the observed route.

On/Off Status: SSF1 may verify that the on/off status of the target device matches that of the wireless marker. For example, the source device may have observed that the target device was off between 1:00 pm and 1:30 pm and then on from 1:30 pm onwards. SSF1 may ask the MME or AMF for the registration status of the device with SUPI1 or IMSI1, and check that it matches the observed on/off status.

Connectivity Status: SSF1 may verify that the connectivity status of the target device matches the wireless marker. For example, the source device may have observed that the target device was not communicating between 1:00 pm and 1:30 pm and then was communicating from 1:30 pm onwards. SSF1 may ask the SMF or PCF for the PDU session status of the device with SUPI1 or IMSI1, and check that it matches the observed connectivity status.

Following the identification of the target device in step 13, in step 14, SSF1 may check whether that identified target device is social. SSF1 may accomplish that via an exchange with one or more of HSS, UDM, UDR and UDSF.

In step 15, SSF1 may return a SocialDiscovery Response to Source Device through MME or AMF. The SocialDiscovery Response message may include the following information entities.

A Transaction ID, as supplied in the SocialDiscovery Request in step 2.

A Target Device Identity, the device identifier of the target device. A list of device identifiers may be provided, if SSF1 was not able to uniquely identify the target device. The target device identifier may be one of IP address, GPSI/MSISDN, SUPI/IMSI, 5G-TMSI/TMSI, 5G-GUTI/GUTI, and any other external identifier. Alternatively, if the target device's registered social permissions or the CN settings require it, instead of the above target device identifiers, a Temporary Social Communication Identifier may be provided.

UniquenessGaurantee, indicating the certainty level associated with the identity of the provided target device. For instance, if SSF1 has identified only a single device as the target device, but yet cannot guarantee that it is the actual identity of the target device. For example, where, as before, the markers include: truck, UPS, in Lower Manhattan, at the corner of Elm and Maple streets, and the M2M/IoT server returns 2 device identities: MSISDN of Truck1 and MSISDN of Truck2. Using these markers, SSF1 may determine that Truck1 is at the corner of Elm and Maple streets, but it cannot find valid location information for Truck2. In this case, SSF1 may return a single device identity (that of Truck1) but also may single to the source device that this identity is not guaranteed to be correct.

Target Device Cellular Network, indicating the cellular network serving the target device if different from the source cellular network. For example, this may be the PLMN ID of a neighboring network where the target device has registered its sociability. Note that some of the target device identifiers already include this information, such as the 5G-GUTI/GUTI and the SUPI/IMSI.

Target Device SSF address, denoting the address of the SSF serving the target device. This may be in the form of an IP address or URI.

As an enhancement, the SocialDiscovery Response message, sent by SSF1 in step 15, may also return additional information to the source device, such as: 1) an indication whether the identified target device is social; 2) one or more of the social permissions of the identified target device; and 3) one or more port numbers associated with the applications on the identified target device.

Social Communication

A Social Communication method may be used by a source device to issue a request to socialize with a target device of interest. The method may be performed after both: 1) the source device's application, APPk, and the target device's application, APPm, have successfully registered for social services with SSF1 and SSF2, respectively; and 2) the source device has discovered the identity of the target device, for example, by using the Social Discovery method discussed above. However, the Social Communication method may be used at any time, and it is not required that registration or discovery are performed before the Social Communication method. As mentioned above, the identity of the target device may be given by: IP address, GPSI/MSISDN, SUPI/IMSI, 5G-TMSI/TMSI, 5G-GUTI/GUTI, other external address, or Temporary Social Communication Identifier, if applicable.

Figure 19:
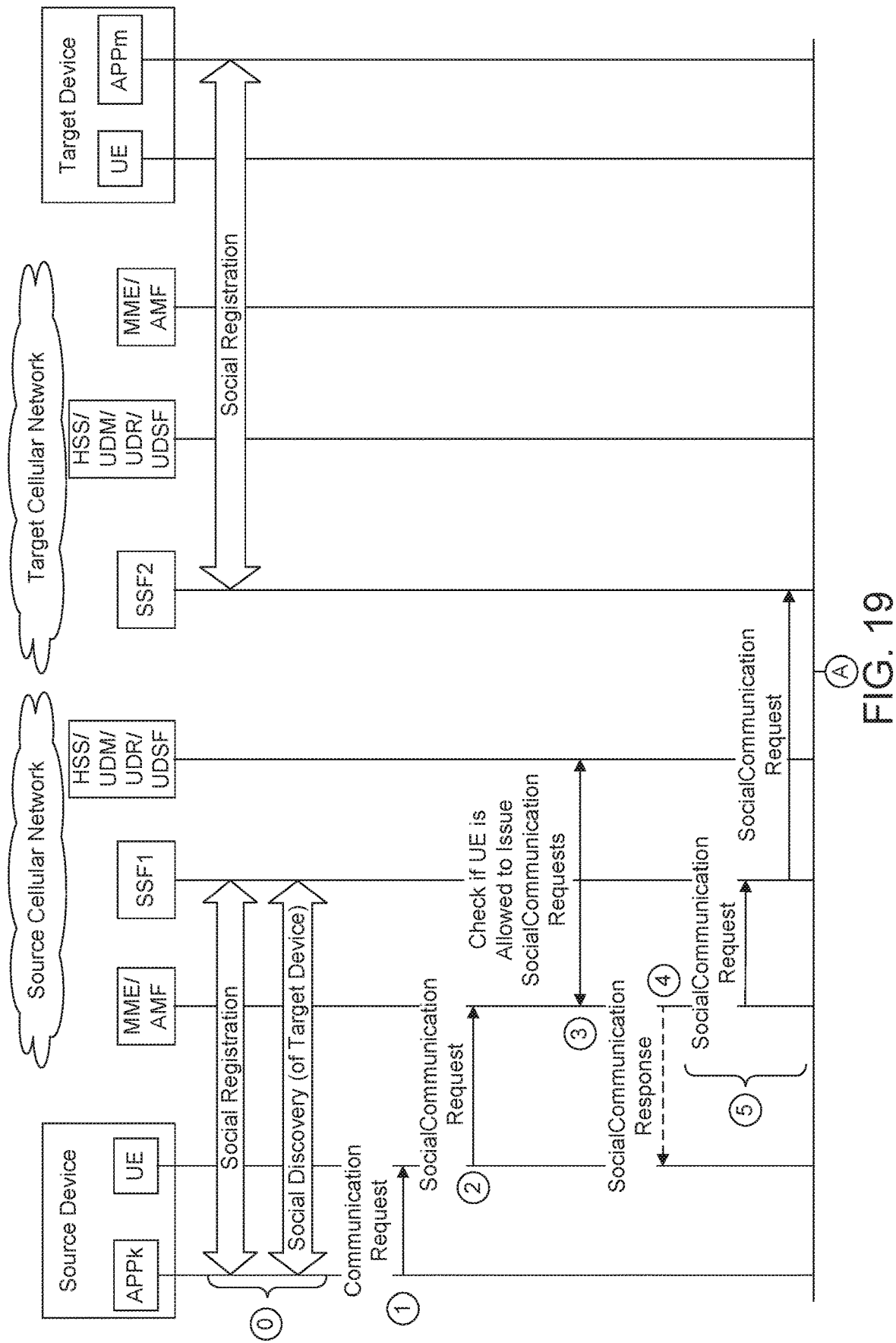
FIG. 19 is a call flow illustrating an example method for social communication.
Figure 19:
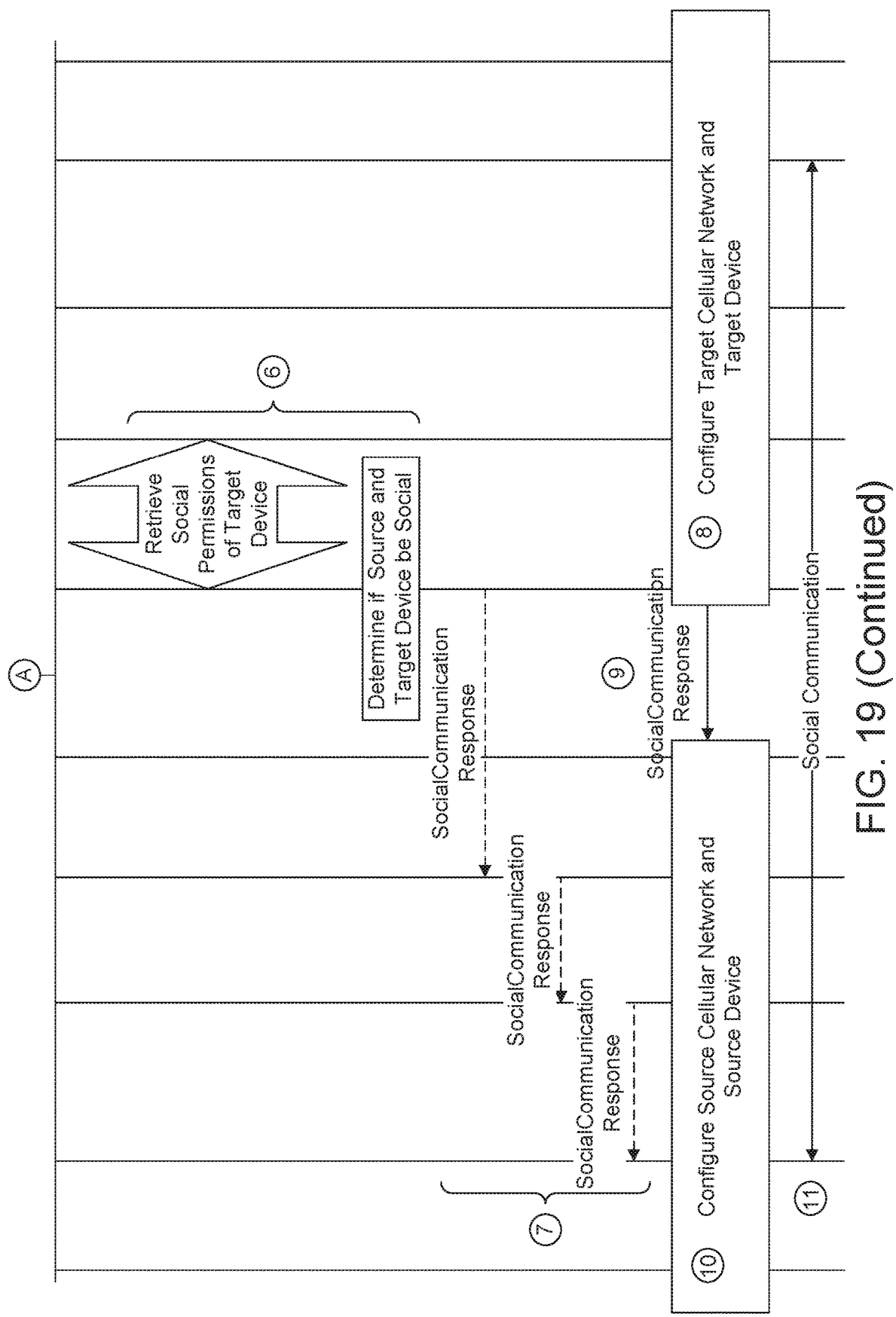

FIG. 19 illustrates one example of a Social Communication method. In this example, the method may begin with an indication, in step 0, that the Social Registration process of Source Device and Target Device, as well as the Social Discovery process of Target Device have been successfully completed. Hence, Social Communication may start when APPk determines that it would like to socialize with the discovered Target Device. APPk may use the Target Device's application identifier, APPm ID, in order to handle the social communication request. Alternatively, APPk may address a default application of Target Device to handle the social communication request. Using the internal device interface, APPk then may request UE to issue a Social Communication request to the cellular network, MME/AMF, as shown in step 2. To facilitate that, APPk may provide UE with one or more of the following information elements:

Application ID, identifying the application;
Source Device address, identifying the target device;
Source Device port, denoting the port associated with the application;
Target Device address, identifying the target device;
Target Device application, denoting the application port on the target device, or, alternatively, a Social Application type or a wildcard/default indication may be used;
Target Device Serving Cellular network, may include the address of either the PLMN or the SSF that serves the Target Device;

Social preferences, specifying conditions under which socialization may be carried out, including one or more of:
A preferred time for socializing with the target device
A preferred communication mechanism, for example, communication via an IP, a cellular network, an M2M/IoT server, a device to device communication using ProSe, or some other communication technology such as WiFi or Bluetooth. If the preferred communication method is via an M2M/IoT server, the address of the server should be provided (e.g., an IP address or a URI).

Following step 2, where the UE forwards the SocialCommunication Request to the AMF or MME, in step 3, the cellular network may then verify whether the UE is permitted to issue sociability requests. For example, it may check the UE's subscription stored on the HSS, UDM, UDR, or UDSF. If the Source Device is not authorized to issue social communication requests, the AMF or MME may respond, in step 4, with a SocialCommunication Response, indicating a cause of "Device not allowed", and at that point all further processing may stop for this method. Otherwise, if the UE is found to be authorized to issue SocialCommunication Requests, in step 5, the AMF or MME may forward the request to the source SSF, SSF1. SSF1, then, may forward that request to the target SSF, that is the SSF that handles the target device, which in this example is SSF2. As indicated above, the identity of the cellular network hosting a target device may be included in the initial request (in step 2). This exchange may be through the SEPP of both cellular networks (not shown in FIG. 19).

Figure 20:
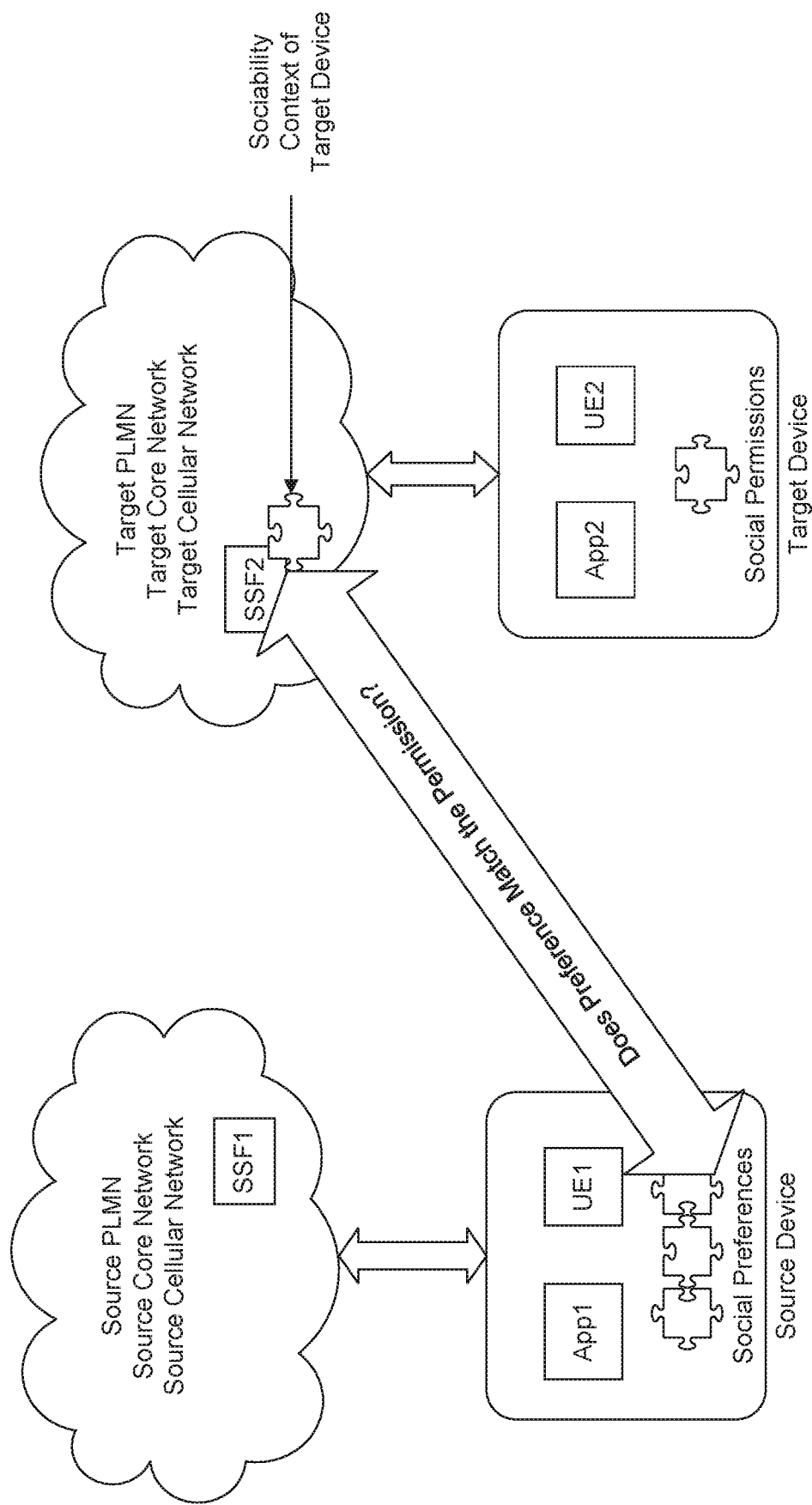
FIG. 20 is a diagram illustrating an example of matching social preference (source device's public policy) to social permissions (target device's public policy)

Upon receiving the SocialCommunication Request, in step 6, the SSF2 may check whether the Source Device and Target Device may be social. SSF2 may need to first retrieve the social permissions of Target Device. Then, SSF2 may compare Source Device's social preferences with Target Device's social permissions. The comparison may determine whether there is an agreement or an overlap between Source Device's preferences and Target Device's permissions, as illustrated in FIG. 20. For example, SSF2 may: 1) evaluate whether Source Device is on Target Device's whitelist (or blacklist) of social devices—devices Target Device would (or would not) want to be social with; 2) determine the time or range of times that both devices are willing to be social; 3) determine the location where both devices are willing to be social, where, for instance, a cell identity or a tracking area identity may define the location boundaries; or 4) determine the communication method to be used—via an IP, a cellular network, a device to device using ProSe, or any other communication technology, such as WiFi or Bluetooth.

In some cases, social communication may not be possible as SSF2 may not be able to match the source device's preferences with the target device's permissions. For example, Source Device may only want to be social for the next 60 minutes, until 1:00 pm, while Target Device may only allow socializing in the evening. If no communication is possible, SSF2 may respond with a SocialCommunication Response message with a cause of "Social Communication Not Possible", as illustrated in step 7, and, thus, all further processing may stop for this method.

When social communication is found to be possible, SSF2, in step 8, may configure the Target Cellular Network and Target Device according to a selected communication method, as is described in detail below. Following that configuration, in step 9, SSF2 may send a SocialCommunication Response to SSF1, including the socializing parameters. Then, in step 10, SSF1 may configure the Source Cellular Network and Source Device according to the selected communication method, as is described in detail below. Being configured, Source Device and Target Device may use the socializing parameters to set up the communication in step 11.

The social communication configuration of Source Device and Target Device and their corresponding cellular networks, takes place in steps 8 and 10 of FIG. 19, respectively. In step 8, the SSF2 may configure the Target Cellular Network and Target Device, and in step 10, the SSF1 may configure the Source Cellular Network and Source Device, to facilitate the social communication. These configurations may depend on the selected communication method. Disclosed below are three examples for the selected communication method: 1) an Internal to Cellular Network; 2) a ProSe Direct Communication; and 3) an Over M2M/IoT Server.

Figure 21:
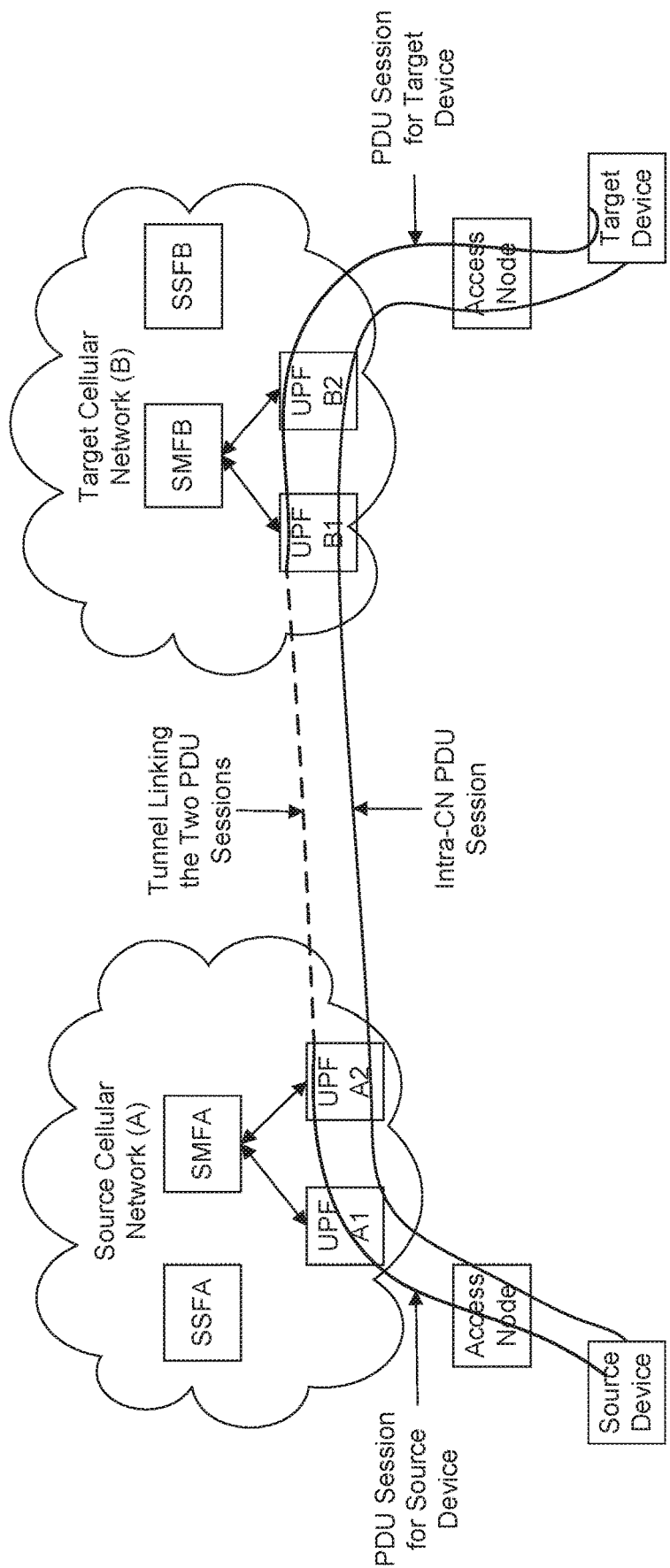
FIG. 21 is a diagram illustrating an example of Intra-CN PDU session.

FIG. 21 illustrates a first example method of communication. In this method, the communication from a source device to a target device may be performed within the cellular operator domain. That is, traffic may not go to any external data networks. Described in the context of a 5G system, the source device and the target device may both establish independent PDU sessions (Source PDU session and Target PDU session). These two PDU sessions may share a Common Session Identifier, and may be linked together through a tunnel. The Common Session Identifier may be assigned by one of the SSFs (for example, SSF2). The combination of the two PDU sessions and the tunnel between them may form a complete end-to-end PDU session between the source device and the target device, and may be referred to herein as an Intra-CN PDU session.

The Intra-CN PDU session that may take place in steps 8 and 10 of FIG. 19, is described next with reference to FIG. 22. Therein, in step 8a and 10a, the corresponding SSF may ask AMF to trigger the establishment of an Intra-CN PDU session, issuing a SessionCreate Request. That SessionCreate Request may include the following elements:
Device Identity, identifying the device to be triggered to establish a PDU session;
Intra-CN session type, indicating that the PDU session is part of an Intra-CN PDU session;
Geographical Area, outside of which the device cannot make a request to establish a PDU session;
Time window, outside of which the device cannot make a request to establish a PDU session;
Common Session Identifier, assigned by SSF2 to uniquely identify this Intra-CN PDU session.

Accordingly, each device may establish its own PDU session with a unique PDU session ID. For example, Source Device may establish Source PDU Session and Target Device may establish Target PDU session. These two sessions will share a Common Session Identifier that may allow their respective SMF to create tunnels to link these two PDU sessions together.

In steps 8b and 10b, the respective AMF may forward the SessionCreate message to the respective device. This may be sent via a new control message. Alternatively, the respective AMF may use a SocialCommunication Response to carry the SessionCreate message (or its contents) to Source Device, and a SocialCommunication Notify to carry the SessionCreate message (or its contents) to Target Device.

Next, in steps 8c and 10c, the UE of the Source Device and the UE of the Target Device may forward the relevant information to APPk and APPm, respectively. In steps 8d and 10d, the APPk and APPm may request to start a social communication exchange. In response, their respective UE may issue a PDUSessionEstablishment request to the AMF1 and AMF2, respectively. That request may include the source PDU session ID, the session type (Intra-CN), and the Common Session Identifier (as obtained in steps 8a and 10a). AMF1 and AMF2 may forward that request to SMF1 and SMF2, respectively, in steps 8e and 10e. Next, the SMFs may select the UPFs that will be used for the PDU session—UPF1 in step 10f and UPF2 in Step 8f—and, then, may configure the selected UPFs with the appropriate rules for the traffic for this PDU session. At this point, the PDU session has been established. Note that FIG. 22 shows that each SMF configures a single UPF, but generally multiple UPFs may be configured.

After UPF2 has been configured, in step 9, SSF2 may send a SocialCommunication Response message to SSF1. This notifies the Source Cellular Network that a PDU session for the Target Device has been set up. It also may provide the tunnel information for UPF2. Note that steps 8g and 10g may not be symmetric (they may be different for the source and target SMF). In step 10g, SMF1 may issue a LinkPDUSessions Request information to SMF2. This request may include the Common Session Identifier as well as the tunnel information for UPF1. In step 8g, SMF2 may update the configuration of UPF2 to create the tunnel with UPF1. SMF2 may also respond back to SMF1 with a LinkPDUSessions Response. At this point the two PDU sessions may be connected with a tunnel. Hence, in steps 8h and 10h, SMF1 and SMF2 respond back to their respective AMF1 and AMF2. Each AMF, then, may configure the access node with the tunnel information as well as any QoS profiles for the traffic. MME1/AMF1 and MME2/AMF2 may respond back to Source Device and Target Device, respectively, in steps 8i and 10i, with a PDUSessionEstablishment Response. At this point, an Intra-CN PDU session has been created through the cellular network and social communication traffic between Source Device and Target Device may flow through this session.

As an alternative to using a Common Session Identifier, PDU session IDs may be transferred between the networks so that each network may identify the PDU session of the other network. Accordingly, in step 9, the SocialCommunication Response to SSF1 may include the PDU Session ID of the PDU session created in the Target Cellular Network. While, in step 10g, the LinkPDUSessions Request to SMF2 may include the PDU Session ID of the newly created session in the Source Cellular Network, as well as the ID of the PDU session in Target Cellular Network to which the source PDU session needs to be linked.

The PDU session establishment in steps 8a/10 through 8i and 10i may rely on the core network requesting that the UE establish the Intra-CN PDU session through a control plane message. However, various other alternatives may be possible. In a first alternative, once the core network has determined that an Intra-CN PDU session needs to be established, it may take the necessary steps autonomously, and then may provide the session information to the respective UE. For example, in steps 8a and 10a, SSF1 or SFF2 may ask their respective MME or AMF to create the Intra-CN session on behalf of the respective UE. In such a case, SSF1 or SFF2 may provide: 1) the Identity of the device that needs to be triggered to establish a PDU session; 2) the Session Type, i.e., Intra-CN; 3) the Geographical Area; 4) the Time Window; 5) and the Common Session Identifier. MME or SMF may then select the UPFs and configure these selected UPFs with the appropriate rules for the session traffic. It also may configure the tunnel information between the UPFs. The session information may then be provided to the respective UE through the respective MME or AMF. In a second alternative, rather than using a control plane message to signal to a UE to establish an Intra-CN PDU session, the core network may send an SMS message to request that a UE establish an Intra-CN PDU session. The SMS message may include one or more of the parameters included in step 8a and 10a.

Figure 22:
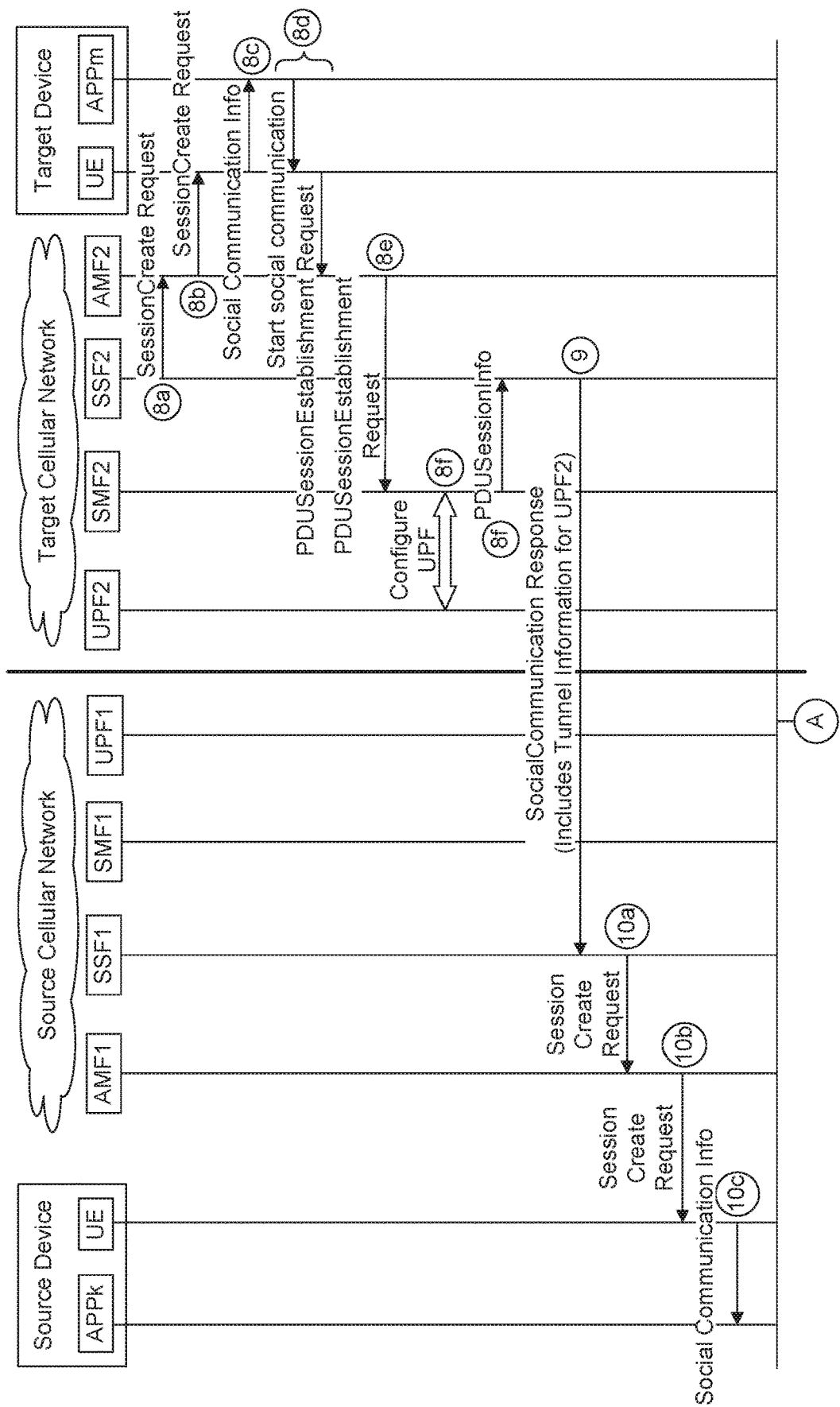
FIG. 22 is a call flow illustrating an example method for communication internal to cellular network.
Figure 22:
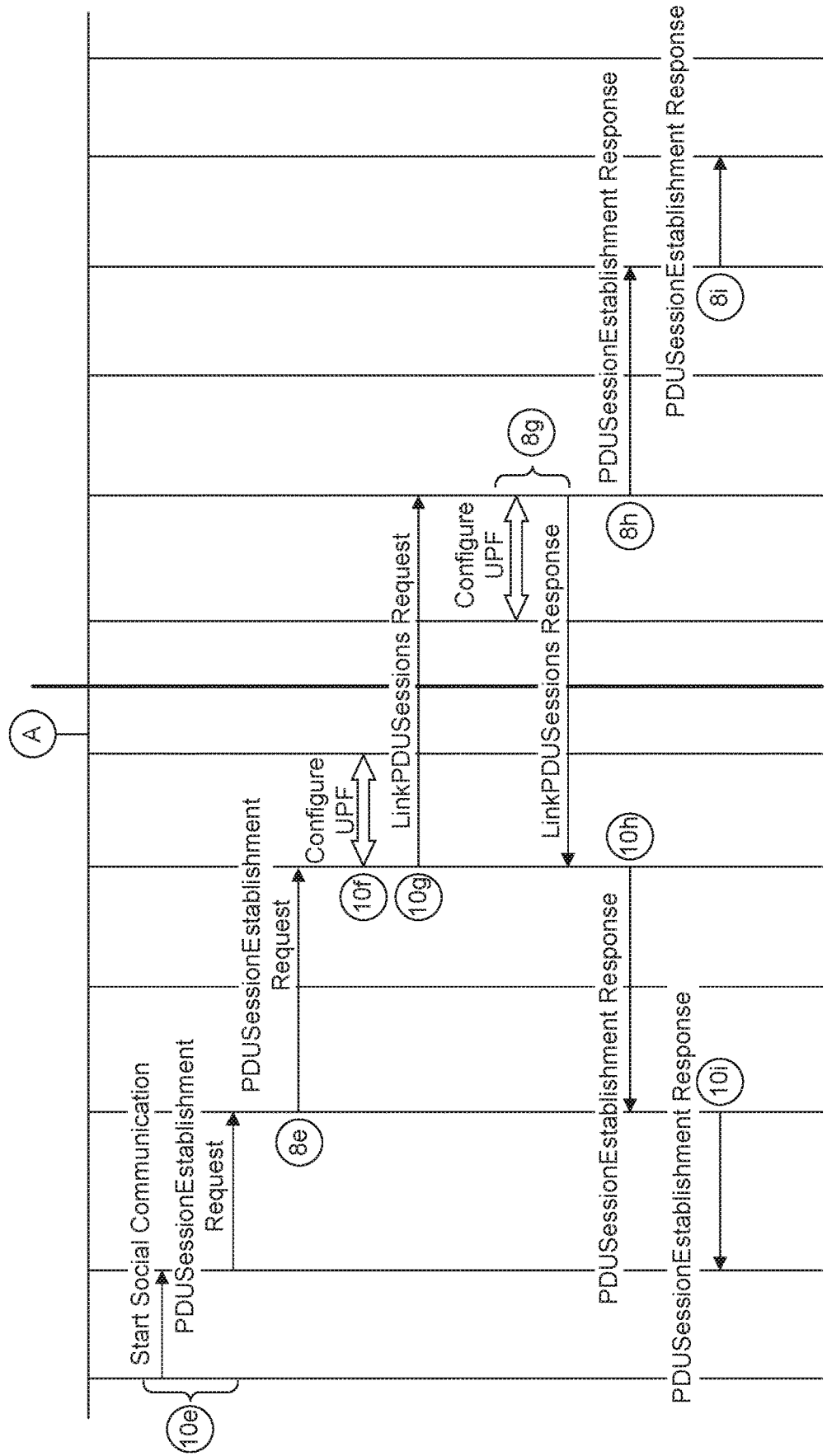

For ease of description only, the call flows in FIG. 21 and FIG. 22 employ 5G terminology. These figures and the corresponding descriptions may also apply to 4G networks—a difference being that PDU sessions are replaced with PDN connections, 5G UPFs are replaced with P-GW and S-GW, and SMFs and AMFs are replaced with MMEs.

Figure 23:
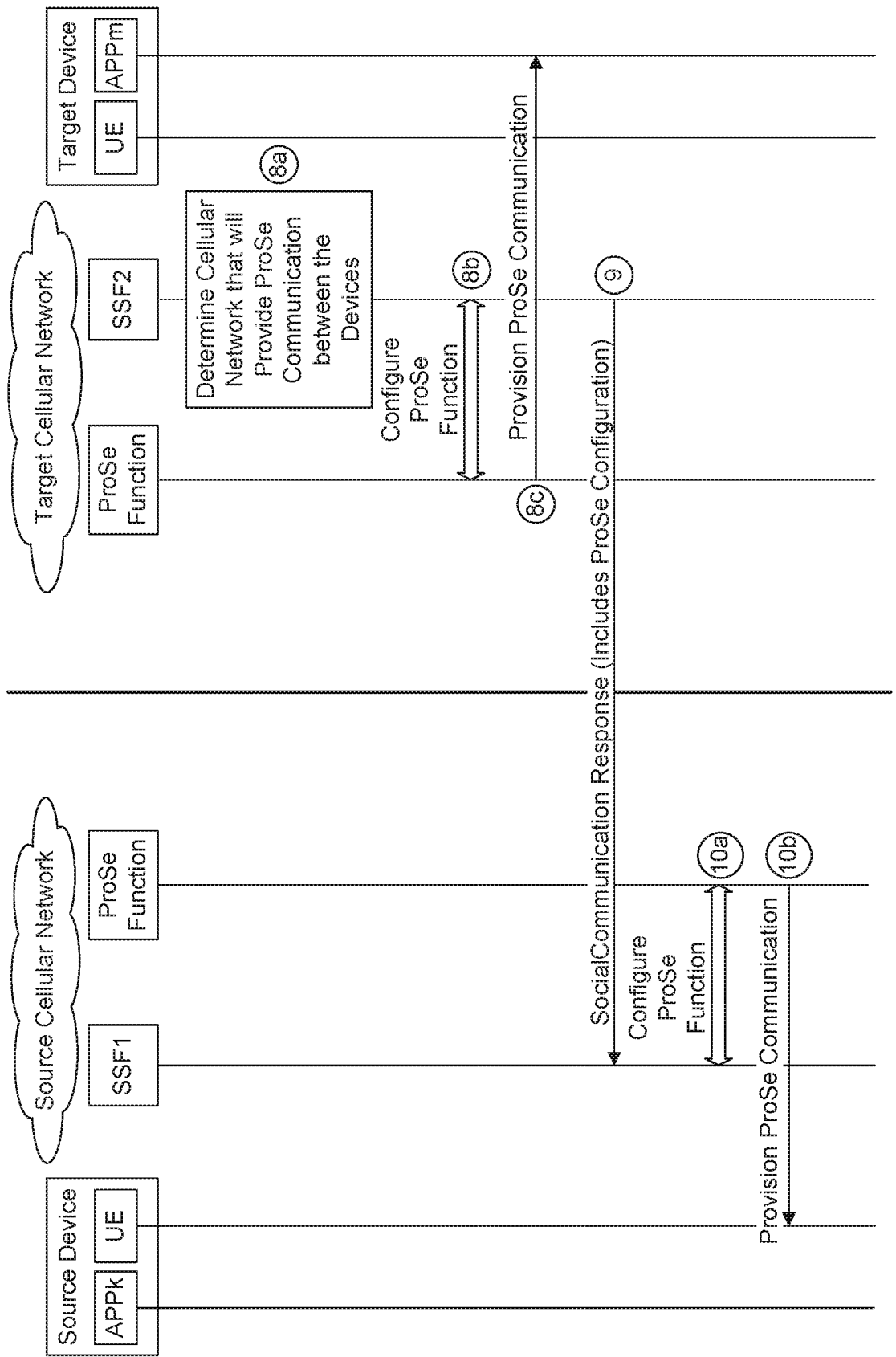
FIG. 23 is a call flow illustrating an example method for communication using ProSe D2D.

FIG. 23 illustrates a second example method of communication that employs ProSe Direct Communication. In this method, SSF2 may determine that the optimum communication from Source Device to Target Device is through a ProSe direct communication link. SSF2 may also determine the radio resources to be used for this communication. Note that it may be that both the source device and the target device are capable of ProSe direct communication, but one or both of these devices may be registered to networks that do not support ProSe direct communications.

Steps 8 and 10 of FIG. 19 are described in detail next in reference to FIG. 23. Starting with step 8a, SSF2 may determine a cellular network that 1) may provide coverage to both Source Device and Target Device; and that 2) may support ProSe direct communication. Next in step 8b, SSF2 may interact with ProSe Function (in the Target Cellular Network) to provide the provisioning for the direct communication. This may include the: identity of UE to provision, allowed geographic areas, allowed time window, the ProSe D2D authorization policy, ProSe D2D communication policy/parameters, ProSe D2D radio parameters, Layer 2 ID of source device, or Layer 2 ID of target device. Then, in step 8c, the ProSe Function may provision the target UE. Following that, SSF2 may send a SocialCommunication Response message to SSF1 in step 9. This may notify the Source Cellular Network that Target Device has been set up for ProSe communication. It also may provide the ProSe configuration information to Source Cellular Network.

Upon receiving the Social Communication Response, in Step 10a, SSF1 may interact with ProSe Function (in the Source Cellular Network) to provide the provisioning for the direct communication. This may include the: identity of UE to provision, allowed geographic areas, allowed time window, ProSe D2D authorization policy, ProSe D2D communication policy/parameters, ProSe D2D radio parameters, Layer 2 ID of source device, or Layer 2 ID of target device. Then, in step 10b, ProSe Function may provision the source UE.

As an alternative to the call flow described in reference to FIG. 23, the ProSe Functions in the different cellular networks may communicate over the PC6 interface. This may allow the ProSe Function in Target Cellular Network to provide ProSe configuration information directly to the source UEs ProSe Function in Source Cellular Network.

Figure 24:
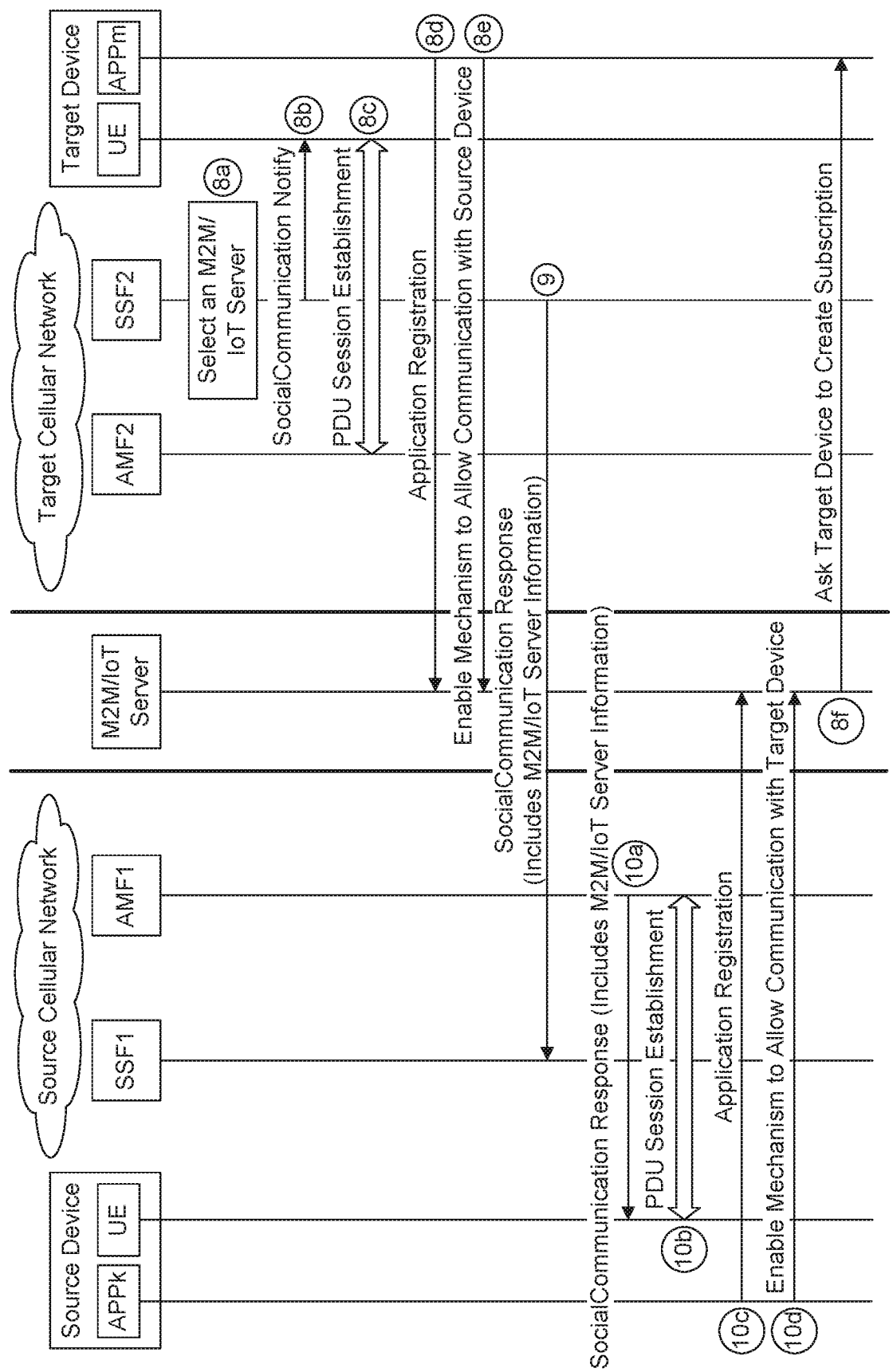
FIG. 24 is a call flow illustrating an example method for communication using M2M/IoT server.

FIG. 24 illustrates a third example method of communication that employs an M2M/IoT Server. In this method, SSF2 has determined that the optimum communication from Source Device to Target Device is through an M2M/IoT Server, which may be IP or non-IP based.

Steps 8 and 10 of FIG. 19 are described in detail next in reference to FIG. 24. Starting in step 8a, SSF2 may select an M2M/IoT server to assist in the social communication. This selection may be based on the social preferences provided by Source Device in the SocialCommunication Request and/or the social permissions provided by Target Device. Alternatively, SSF2 may choose some other entity to act as an M2M/IoT Server. Once an M2M/IoT Server has been selected, in step 8*b*, SSF2 may send a SocialCommunication Notify message to Target Device. This message may include: 1) a Social Communication Identifier, used in the M2M/IoT server to identify the social communication between Source and Target devices; 2) an Address of the selected M2M/IoT server (as determined in Step 8*a*); 3) a Geographical Area; or 4) a Time Window.

Next, in step 8*c*, Target Device may use SocialCommunication Notify to trigger a PDU session establishment. If not already registered in the M2M/IoT server, Target Device may register to the server in Step 8*d*, providing the Social Communication Identifier. Then in step 8*e*, Target Device may create the mechanism to allow communication with Source Device. This step may depend on the technology used by the selected M2M/IoT server. For example, if such a server is oneM2M compliant, communication between Source and Target Devices will likely be through container resources. In such a case, Target Device may create a targetContainer resource, possibly labeling it with the unique Social Communication Identifier.

Once a mechanism allowing communication with Source Device is enabled, in step 9, SSF2 may send a SocialCommunication Response message to SSF1. This may notify Source Cellular Network that Target Device is ready to communicate over the M2M/IoT server. It may also include the socializing parameters, such as the identity (address) of the M2M/IoT server or the address of the container resource created by Target Device.

Notified that Target Device is ready to communicate over the M2M/IoT server, SSF1 may send, in step 10*a*, a Social-Communication Response to Source Device. This message may include the Social Communication Identifier (as may be used in the M2M/IoT server to identify the social communication between Source and Target devices), the address of the selected M2M/IoT server (as may be determined in step 8*a*), Geographical Area, or Time Window. Then, in step 10*b*, Source Device may use the SocialCommunication Response message to trigger a PDU session establishment. If not already registered to the M2M/IoT server, Source Device may register to the server in step 10*c*, providing the Social Communication Identifier.

Next, in step 10*d*, Source Device may create the mechanism to allow communication with Target Device. This step may depend on the technology used by the M2M/IoT server. For example, if such a server is oneM2M compliant, communication between the devices will likely be through container resources. Accordingly, Source Device may create a sourceContainer resource, possibly labeling it with the unique Social Communication Identifier. It may further subscribe to be notified when Target Device writes to the targetContainer. At this point, in step 8*f*, Target Device may send traffic to Source Device, but communication in the other direction is not possible. To enable the Source Device to send traffic to Target Device, the latter may need to subscribe to the sourceContainer. Hence, the M2M/IoT server may ask Source Device to create such a subscription.

Another aspect of this disclosure pertains to allowing incoming network connections. Once the cellular networks and the source and the target devices are configured, the source and target devices may begin their social communication. In this communication, it is assumed that one device may know how to reach the peer device (e.g., via IP address) and may know the listening (open) port on this peer device. One issue with cellular devices is that they typically try to limit the number of open ports—open ports may be dangerous as they may lead to security vulnerabilities. For this reason, cellular devices often use a polling mechanism, which eliminates the need for open ports, or they may rely on application triggering (through an SMS message) to dynamically signal a cellular device to start a connection.

In accordance with another aspect, the cellular network control plane may be used to tell a device to open a port. This method is described below using a control plane (NAS) message, however, this method may be extended using a cellular network controlled device trigger. Hence, assuming a source device wants to establish a connection with a target device, the source device may know how to reach the target device (e.g., via target IP address or MSISDN), and it may also know the port the target device wishes to use to accept the incoming network connection (target Port). However, the target Port on the target device may not be open. To address such a situation, the following example approaches may be employed.

A first approach involves a network connection opened as part of a social communication configuration. In this approach, the target device is asked to open the port during the social communication configuration (see description above in reference to FIG. 19 and FIG. 20). The port choice may be based on the ports registered and the Social Application type. In particular, the SocialCommunication Notify message may include the following new fields: 1) Open Port Indication, indicating opening a listening port for the social communication; 2) Port Number, indicating the port that may be opened; and 3) Source Device Identity, identifying the source device that may be used the open port. Upon receiving the SocialCommunication Notify message, the source device may open the requested port and begin listening on that port. It may also use the Source Device Identity to act as a whitelist—the target device may only accept connection requests from this device.

Figure 25:
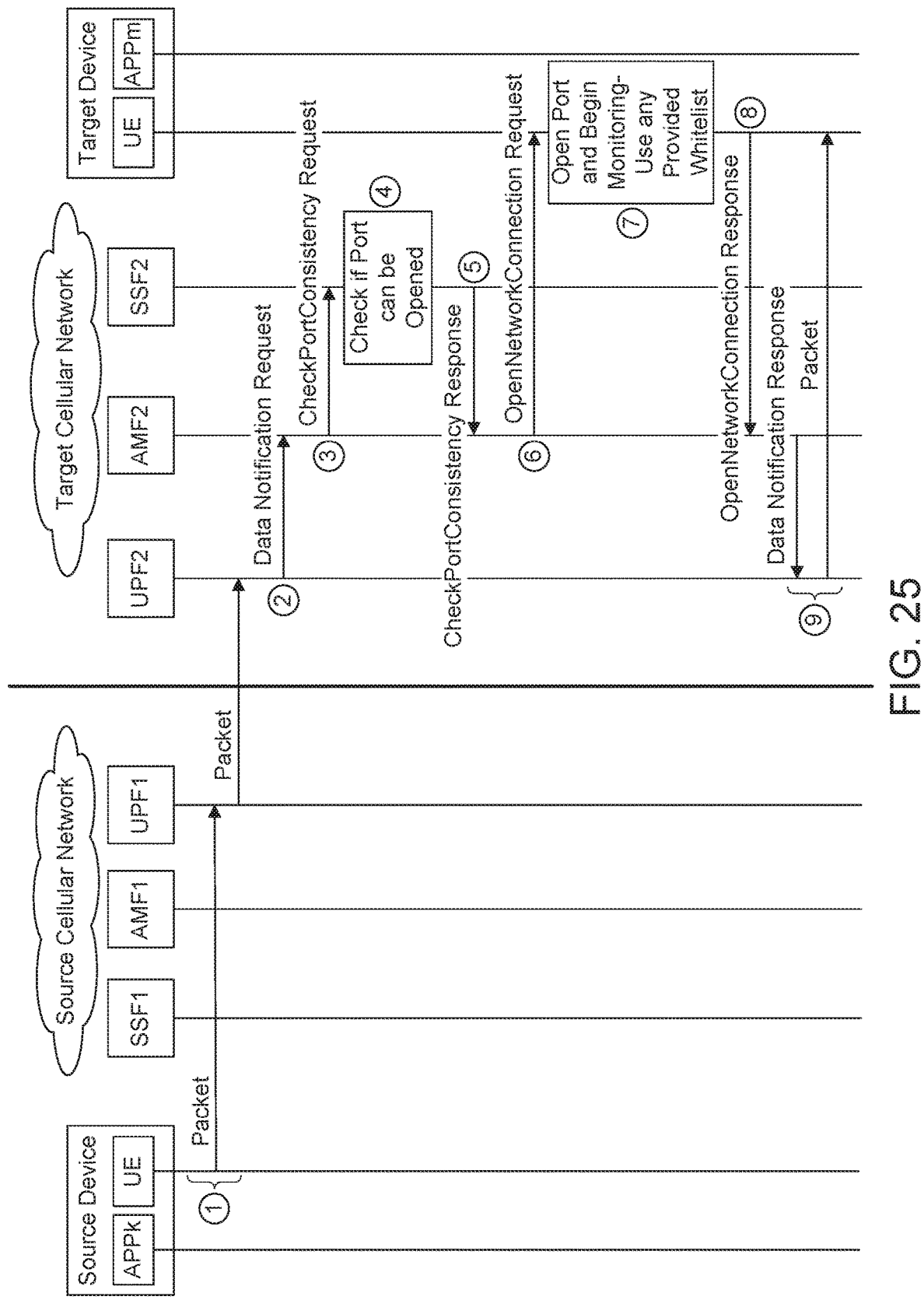
FIG. 25 is a call flow illustrating an example method for network connection opened during initial communication of connection.

A second approach involves a network connection that is opened during the initial communication of a connection. In this approach, the target device may be asked to open the port with a new control plane message from the core network. A typical call flow for a 5G network is depicted in FIG. 25. Therein, an Intra-CN session has been established between the source device and the target device, and the source device may know the identity of the target device (e.g., IP address or MSISDN). The source device may also know which port to use on the target device (e.g., port A). Alternatively, the source device may not know the explicit port number, but it may know that the device has a default port to deal with incoming connection requests.

With reference to FIG. 25, the second approach starts, in step 1, with the source device sending a packet. The packet may flow through the Intra-CN PDU session and may arrive at UPF2 (final destination is the target device). The packet may include the Destination Identity, identifying the identity (address) of the target device (e.g., IP address or MSISDN). The packet may also include the Destination Port. If the source device knows the port number on the target device, it may be included in the packet. If the source device does not know the port number on the target device, it may use a default/wildcard port number. This default or wildcard port number may indicate to the cellular network to use the default port number associated with the target device. Next, in step 2, UPF2 may send a Data Notification message to AMF2 (or SMF2). This message may contain Destination Identity or Destination Port.

In step 3, AMF2 or SMF2 may contact SSF2 to check whether the provided port information is allowed. It may issue a CheckPortConsistency Request that may include the Destination identity, Destination Port, and a Transaction ID. SSF2 may check the SocialPermissions of the target device, in step 4. If the Destination Port field has a Port number, SSF2 may check if it corresponds to a valid port number as stored in the SocialPermissions. If so, SSF2 may select it as the port to open. If the Destination Port field is a default/wildcard indication, SSF2 may look in the SocialPermissions for the device's default port. SSF2, then, may select it as the port to open.

SSF2 may return CheckPortConsistency Response to AMF2 (or SMF2), in step 5, including an indication of the selected port and the Transaction ID (received in step 3). In step 6, then, AMF2 may send back a control message to the target device, requesting that the device open that port for listening. This may be an OpenNetworkConnection Request. This request may include: 1) an Open Port Indication, providing an indication to open a listening port for the social communication; 2) a Port Number, indicating the port to be opened; and 3) a Source device identity, identifying the source device that will use the open port. If necessary, AMF2 first may page UE of Target Device before sending the OpenNetworkConnection Request. This request may include an indication that the paging was to open a port.

In step 7, Target Device may open the requested port and may begin listening on that port. It may also use the Source Device Identity to act as a form of whitelist—Target Device may only accept connection requests from this device. Next, in step 8, Target Device may respond back to AMF2 or MME2 with an OpenNetworkConnection Response, indicating success or failure. Then, in step 9, UPF2 may be informed that the port is opened, and so the packet may be sent to Target Device. As an alternative, the indication to open the port on the Target Device may be part of the Network Triggered Service Establishment procedure.

Note that the method described above may be generalized to any source entity. For example, the source entity in FIG. 25 is shown as a source device that wants to start socializing with a target device. However, it is also possible that the source entity is a cloud server that needs to communicate with an application on a cellular device. In this case, the cloud server may use this mechanism as an alternative to Application Triggering.

In accordance with another aspect disclosed herein, a combined Social Discovery and Social Communication method may be employed. In FIG. 18 and FIG. 19, and in the corresponding text above describing Social Discovery and Social Communication, respectively, an assumption may be that a source device and a target device will first perform a Social Discovery method followed by a Social Communication method. However, these methods may be combined into a single method, which may be referred to herein as a SocialDiscComm method. A source device may include in the SocialDiscComm Request information elements such as: Application ID, Source Device address, Source Device port/application, Social Markers of a target device (attributes of the target device that may have been observed or measured), Time Window (the time the application is willing to wait for a response before the request may be ignored or deleted), and Social Preferences (application specified conditions under which it is willing to socialize). The core network will then discover the identity of the target device (FIG. 18, step 2 to step 14 of the Social Discovery method) and then establish communication with this device (FIG. 19, step 6 to step 11 of the Social Communication method).

In the combined method, an indirect social discovery and communication may be employed. In this method, the CN may be the only one that retains the mapping between the social markers of the source device and the social identifiers of the target device. The source device may issue a request to send information (a message) to the target device, having social markers (with which the target device may be identified) and having the message included in the request. Hence, the CN may not provide the source with the target network identifiers. As the initial request already includes the message, CN may forward it to the target it identifies and may provide only an acknowledgement to the source, which may also indicate the level of certainty of identification of the target, and the success/failure status of the delivery. However, if the initial request does not include the message, CN may provide an acknowledgement that a target has been identified and a transaction number. The target device may not be identified to the source device. The source device may follow up with one or more exchanges including the provided transaction number, through which it provides the message to be delivered to the target. This approach may be suited for limited exchanges between a source and a target device, such as when a source device needs to send a single message to a target device. For example, this approach would allow a source device to ask the core network to merely send a message "Watch out for a fallen tree two miles ahead" to a car with a license plate of XYZ 123.

Figure 26:
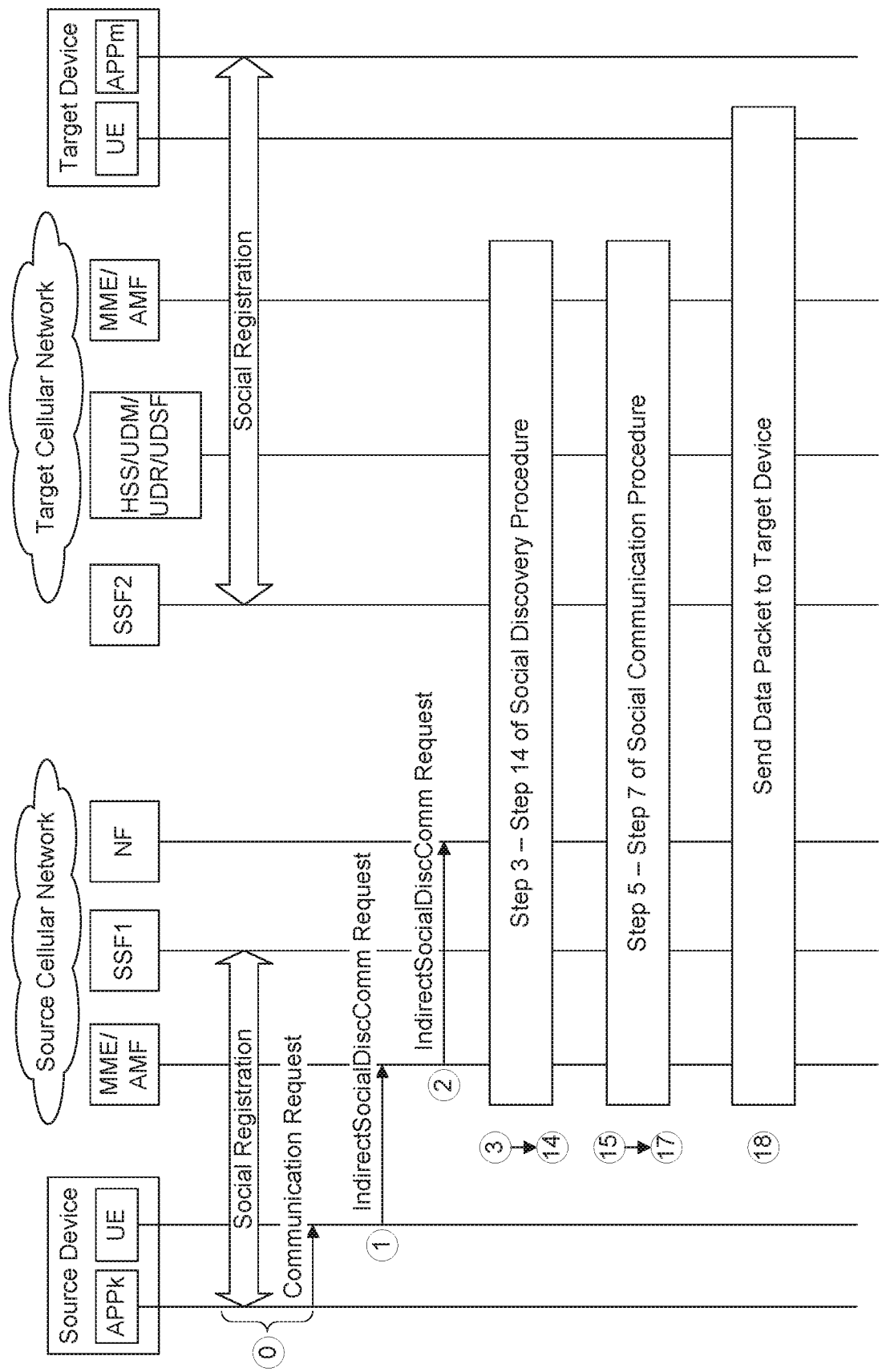
FIG. 26 is a call flow illustrating an example method for indirect social discovery and communication.

FIG. 26 illustrates one example of the overall combined method. Assuming Source Device has a packet to send to Target Device, and that the former has identified social markers of latter, the process may start in step 1 where Source Device may send an IndirectSocialDiscComm Request to Source Cellular Network. This message may be over a control plane message. The request may include: an Application ID, a Source Device Address, a Source Device Application Port, Social Markers of Target Device (attributes of Target Device that may have been observed or measured), a Time Window (the time duration APPk may be willing to wait for a response before the request may be ignored or deleted), Social Preferences (application specified conditions under which it is willing to socialize), and an Encapsulated Data Packet to send to target device. In step 2, the IndirectSocialDiscComm Request may reach MME or AMF. The request may then be forwarded to a network function handling control plane data. This may be a new network function/entity or an existing network function/entity (for example MME, AMF, or SMF).

Next, steps 3-14 are similar to steps 3-14 in the Social Discovery method shown in FIG. 18. Likewise, steps 15-17 are similar to steps 5-7 in the Social Communication method shown in FIG. 19. Then, in step 18, the data packet (from step 1) may be sent to the Target Device. This may be achieved through one or more of the following options:

- page Target Device with an indication that mobile terminated data is on the way, then, the data packet can be sent to it through a control plane message;
- page Target Device and include the data packet in the Paging message;
- trigger Target Device to wake up and retrieve the data packet; or
- send the data packet as an SMS to Target Device.

Figure 27:
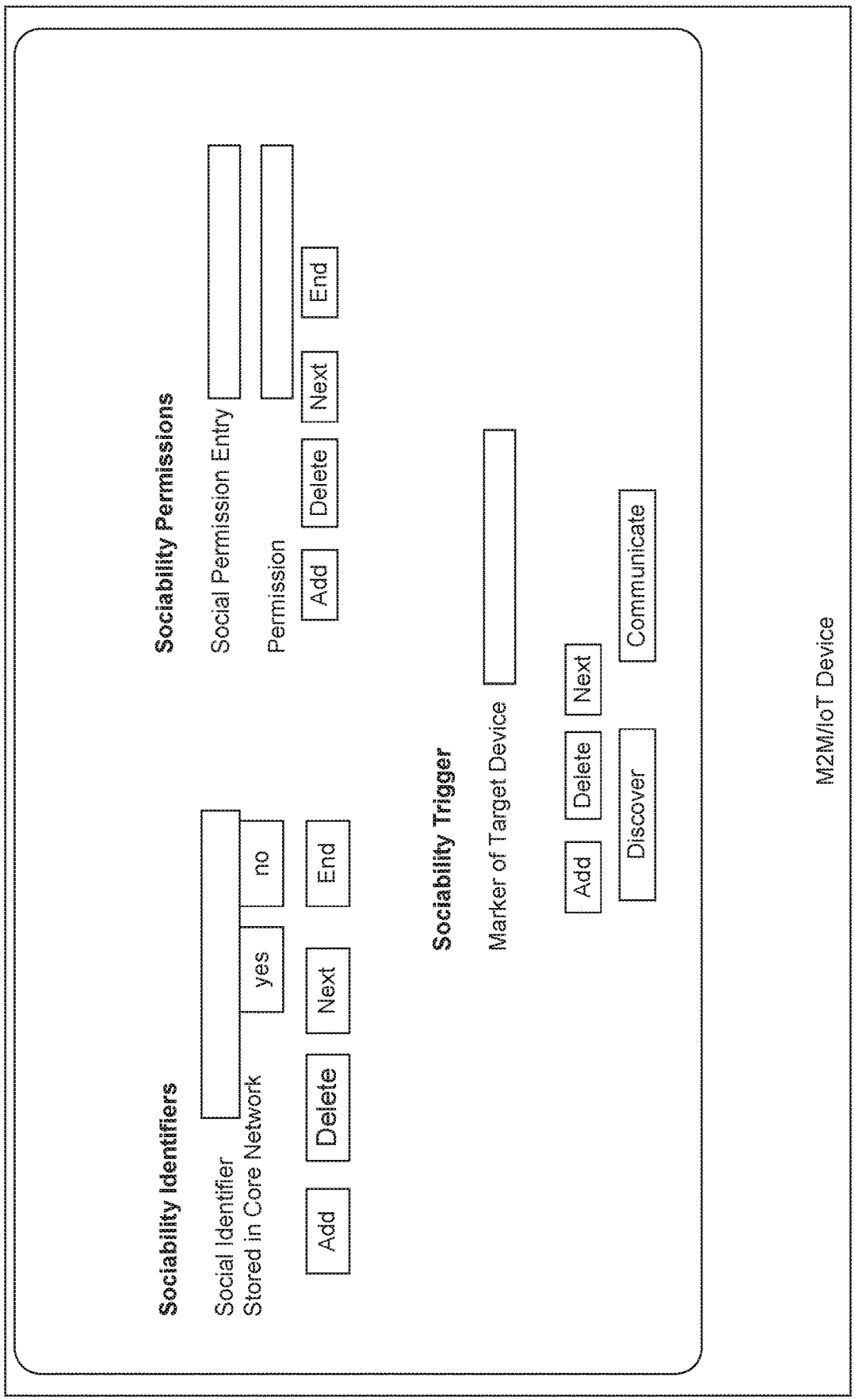
FIG. 27 is a diagram of an example Graphical User Interface at an M2M/IoT device.

Aspects disclosed herein may include a Graphical User Interface (GUI), such as the GUI illustrated in FIG. 27. Such a GUI may be used in M2M/IoT devices to provide means to enter data, such as control data, as well as display data, such as diagnostic data. For example, the GUI may be used to enter a device's sociability context, including its social identifiers and its social permissions or preferences (i.e., social policy). The GUI may also be used to direct the UE as to where to store the sociability context—in the SSF or in a certain M2M/IoT Server. Furthermore, the GUI may be used to trigger a sociability registration, a social discovery, or a social communication. The GUI may display incoming social communication requests received by the UE.

It is understood that the entities illustrated in the various architectures of FIGS. 1, 3-6, and 8-10 and the entities performing the steps illustrated in FIGS. 11, 12, 14, and 17-26, such as the RNC, MSC, MGW, GGSN, SGSN, MME, PDN, ASN, AAA, MIP-HA, WTRU, N3IWF, AUSF, UDM, AMF, SMF, PCF, AF, UPF, DN, UDM, UDR, AMF, UDSF, NEF, SMF, UPFs, HSS, P-GW, S-GW, SCEF, SCS, S/PGW, SLP, V-NSSF, V-PCF, AUSF, UDM, H-NSSF, AMF, V-SMF, H-SMF, H-PCF, AF, UPF, and the like, may be logical entities that may be implemented in the form of software (i.e., computer-executable instructions) stored in a memory of, and executing on a processor of, an apparatus configured for wireless and/or network communications or a computer system such as those illustrated in FIG. 2 or FIG. 7. That is, the method(s) illustrated in the figures may be implemented in the form of software (i.e., computer-executable instructions) stored in a memory of an apparatus, such as the apparatus or computer system illustrated in FIG. 2 or FIG. 7, which computer executable instructions, when executed by a processor of the apparatus, perform the steps illustrated in the figures. It is also understood that the functionality illustrated in the figures may be implemented as a set of virtualized network functions. The network functions may not necessarily communicate directly, rather, they may communicate via a forwarding or routing function. It is also understood that any transmitting and receiving steps illustrated in the figures may be performed by communication circuitry of the entity under control of the processor of the entity and the computer-executable instructions (e.g., software) that it executes.

The illustrations of the aspects described herein are intended to provide a general understanding of the structure, function, and operation of the various aspects. The illustrations are not intended to serve as a complete description of all of the elements and features of apparatuses and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The description of the aspects is provided to enable the making or use of the aspects. Various modifications to these aspects will be readily apparent, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. An apparatus comprising a processor and a memory, the memory storing computer-executable instructions that, when executed by the processor, cause the apparatus to perform operations comprising:
    transmitting, to a core network entity of a cellular network configured to enable a sociability service among devices connected to the cellular network, the sociability service comprising at least one of a social discovery service or a social communication service, a request to register to the sociability service, wherein the request comprises a first sociability context and wherein the first sociability context comprises one or more of a first social identifier and or a first social policy of the apparatus;
    receiving, from the core network entity and based on the first social identifier, a response to the request to register, the response to the request to register comprising an indication that the apparatus is registered with the sociability service;
    transmitting, to the core network entity, a request to discover at least one device of the devices connected to the cellular network, the request comprising social markers characterizing the at least one device, wherein the requested discovery is based on a comparison between the social markers and a second social identifiers of the at least one device; and
    receiving, from the core network entity, a response to the request to discover, the response to the request to discover comprising an identity of the at least one device discovered based upon the comparison, wherein the response to the request to discover further comprises one or more of a second social policy of the at least one device, discovered based upon the comparison, an indication whether the at least one device discovered based upon the comparison is social, a uniqueness guarantee indicating a certainty level associated with the identity of the at least one device discovered based upon the comparison, or a port number associated with an application on the at least one device discovered based upon the comparison.

2. The apparatus recited in claim 1, wherein the computer executable instructions further cause the apparatus to perform operations comprising:
    transmitting, to the core network entity, a request to communicate with the at least one device discovered based upon the comparison; and
    receiving, from the core network entity, a response to the request to communicate, the response to the request to communicate comprising a communication configuration based on the first social policy of the apparatus and the second social policy of the at least one device discovered based upon the comparison.

3. The apparatus recited in claim 2, wherein the communication configuration is based on a selected communication method and wherein the selected communication method is one of Internal to Cellular Network, ProSe Direct Communication, or over M2M/IoT Server.

4. The apparatus recited in claim 1, wherein the computer executable instructions further cause the apparatus to perform operations comprising:
    upon entering a cell of the cellular network, receiving a system information broadcast within the cell indicating that the cellular network comprises the core network entity configured to enable the sociability service among the devices connected to the cellular network.

5. The apparatus recited in claim 1, wherein the computer executable instructions further cause the apparatus to perform operations comprising:
    measuring the social markers characterizing the at least one device, wherein the social markers comprise one or more of physical attributes or wireless attributes, and wherein the physical attributes and the wireless attributes are either unique or non-unique attributes.

6. The apparatus recited in claim 1, wherein the identity of the at least one device is further based on a second sociability context of other devices connected to other cellular networks, and wherein the second sociability context of the other devices is accessible to the core network entity via at least one of the entities of the other cellular networks.

7. The apparatus recited in claim 1, wherein the identity of the at least one device discovered based upon the comparison is a temporary identity or a transaction identity.

8. The apparatus recited in claim 1, wherein the computer executable instructions further cause the apparatus to perform operations comprising:
interfacing with a user through a graphical user interface, wherein the graphical user interface receives data associated with the sociability service or displays the data associated with the sociability service.

9. The apparatus recited in claim 1, wherein the at least one device comprises input mechanisms, a 3GPP User Equipment, and at least one social application, wherein the at least one social application communicates with the 3GPP User Equipment through an internal device interface.

10. An apparatus implementing an entity of a core network of a cellular network and configured to provide a sociability service among devices connected to the cellular network, the apparatus comprising a processor and a memory, the memory storing computer-executable instructions that, when executed by the processor, cause the entity to perform operations comprising:
receiving, from each of two or more devices in communication with the core network, a request to register the device to the sociability service, the request comprising a first sociability context, wherein the first sociability context comprises first social identifiers and a first social policy associated with the device;
storing the first sociability context of each of the two or more devices;
receiving, from a first device of the two or more devices, a request to discover at least one device of the two or more devices, the request comprising social markers characterizing the at least one device to be discovered;
comparing the social markers in the request to discover the first social identifiers of the stored sociability context of the two or more devices; and
sending, to the first device, a response to the request to discover the at least one device of the two or more devices, the response to the request to discover comprising an identity of a second device of the two or more devices, wherein the social markers in the request to discover match the first social identifiers of the first sociability context of the second device and wherein the response to the request to discover further comprises one or more of a second social policy of the second device, discovered based upon the comparison, an indication whether the second device discovered based upon the comparison is social, a uniqueness guarantee indicating a certainty level associated with the identity of the second device discovered based upon the comparison, or a port number associated with an application on the second device discovered based upon the comparison.

11. The apparatus recited in claim 10, wherein the computer executable instructions further cause the entity to perform operations comprising:
receiving, from the first device, a request to communicate with the second device; and
sending, to the first devices in response to the request to communicate, a communication configuration based on a first social policy of the first device and a second social policy of the second device.

12. The apparatus recited in claim 11, wherein the communication configuration is based on a selected communication method and the selected communication method is one of Internal to Cellular Network, ProSe Direct Communication, or over M2M/IoT Server.

13. The apparatus recited in claim 10, wherein the cellular network transmits a system information broadcast indicating that the cellular network is configured to enable the sociability service among the devices connected to the cellular network.

14. The apparatus recited in claim 10, wherein the social markers in the request to discover comprise one or more of physical attributes or wireless attributes, wherein the physical attributes and the wireless attributes are either unique or non-unique attributes.

15. The apparatus recited in claim 10, wherein the comparison includes comparing the social markers in the request to discover to social identifiers of other devices connected to other cellular networks, and wherein the sociability context of the other devices is accessible to the cellular network entity via one or more entities of the other cellular networks.

16. The apparatus recited in claim 10, wherein the identity of the second device is a temporary identity or a transaction identity.

17. The apparatus recited in claim 10, wherein each of the two or more devices comprises a graphical user interface, wherein the graphical user interface receives data associated with the sociability service or displays data the data associated with the sociability service.

18. An apparatus implementing an entity of a core network of a cellular network and configured to provide a sociability service among devices connected to the cellular network, the apparatus comprising a processor and a memory, the memory storing computer-executable instructions that, when executed by the processor, cause the entity to perform operations comprising:
receiving, from each of two or more devices in communication with the core network, a request to register the device to the sociability service, the request comprising a first sociability context, the sociability context comprising first social identifiers and a first social policy associated with the device;
storing the first sociability context of each of the two or more devices;
receiving, from a first device of the two or more devices, a combined request to discover at least one device of the two or more devices and to communicate to the at least one device, the combined request comprising a message from the first device and social markers characterizing the at least one device;
comparing the social markers in the combined request to the social identifiers of the stored sociability context of each of the two or more devices;
determining an identity of a second device of the two or more devices, wherein the social markers in the request of the first device match second social identifiers of a sociability context of the second device, and wherein the message comprises one or more of a second social policy of the second device, discovered based upon the comparison, an indication whether the second device discovered based upon the comparison is social, a uniqueness guarantee indicating a certainty level associated with the identity of the second device discovered based upon the comparison, or a port number associated with an application on the second device discovered based upon the comparison; and sending the message from the first device to the second device.

* * * * *

UNITED STATES PATENT AND TRADEMARK OFFICE
CERTIFICATE OF CORRECTION

| | | |
|---|---|---|
| PATENT NO. | : 12,004,257 B2 | Page 1 of 1 |
| APPLICATION NO. | : 17/283076 | |
| DATED | : June 4, 2024 | |
| INVENTOR(S) | : Rocco Di Girolamo et al. | |

It is certified that error appears in the above-identified patent and that said Letters Patent is hereby corrected as shown below:

In the Claims

In Claim 1: Column 46, Line 19, delete "identifiers", and insert -- identifier --

In Claim 11: Column 48, Line 1, delete "devices", and insert -- device --

In Claim 15: Column 48, Line 22, delete "discover to"

Signed and Sealed this
Eighth Day of April, 2025

Coke Morgan Stewart
*Acting Director of the United States Patent and Trademark Office*